US012110243B2

(12) United States Patent
Magnusson et al.

(10) Patent No.: US 12,110,243 B2
(45) Date of Patent: Oct. 8, 2024

(54) BIOFILM CARRIER MEDIA IN MOVING BED BIOFILM REACTOR PROCESSES

(71) Applicant: VEOLIA WATER SOLUTIONS & TECHNOLOGIES SUPPORT, Saint-Maurice (FR)

(72) Inventors: Per Magnusson, Malmö (SE); Christian Rosen, Lomma (SE)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 0 days.

(21) Appl. No.: 16/964,985

(22) PCT Filed: Jan. 29, 2019

(86) PCT No.: PCT/EP2019/052091
§ 371 (c)(1),
(2) Date: Jul. 26, 2020

(87) PCT Pub. No.: WO2019/145554
PCT Pub. Date: Aug. 1, 2019

(65) Prior Publication Data
US 2021/0047204 A1 Feb. 18, 2021

(30) Foreign Application Priority Data
Jan. 29, 2018 (SE) .................... 1850094-2

(51) Int. Cl.
C02F 3/12 (2023.01)
C02F 1/24 (2023.01)
(Continued)

(52) U.S. Cl.
CPC ............... *C02F 3/104* (2013.01); *C02F 1/24* (2013.01); *C02F 3/08* (2013.01); *C02F 3/121* (2013.01);
(Continued)

(58) Field of Classification Search
CPC .... C02F 3/104; C02F 1/24; C02F 3/08; C02F 3/121; C02F 11/12; C02F 11/13;
(Continued)

(56) References Cited

U.S. PATENT DOCUMENTS 3,025,151 A * 3/1962 Berg .................. C02F 3/12
210/625
4,575,427 A * 3/1986 Ysern de Arce ...... C09K 17/52
210/770
(Continued)

FOREIGN PATENT DOCUMENTS

CA          1331893 C     9/1994
CN      101343130 A     1/2009
(Continued)

OTHER PUBLICATIONS

Richard Stehouwer, https://extension.psu.edu/what-is-sewage-sludge-and-what-can-be-done-with it#:~:text=Sewage%20sludge%20is%20composed%20of,organic%20chemicals%2C%20and%20some%20pathogens. (Year: 2010).*

(Continued)

*Primary Examiner* — Ekandra S. Miller-Cruz
(74) *Attorney, Agent, or Firm* — COATS & BENNETT, PLLC

(57) ABSTRACT

The invention pertains to a bio-carrier to carry a biofilm in a moving bed biofilm reactor (MBBR), the carrier being a particle comprising dehydrated sludge. The use of a bio-carrier in a MBBR process to purify a liquid from contaminants is disclosed and a method of manufacture of a bio-carrier is provided.

32 Claims, 12 Drawing Sheets

(51) Int. Cl.
  *C02F 3/08*   (2023.01)
  *C02F 3/10*   (2023.01)
  *C02F 3/30*   (2023.01)
  *C02F 11/12*  (2019.01)
  *C02F 11/122* (2019.01)
  *C02F 11/127* (2019.01)
  *C02F 11/13*  (2019.01)
  *C02F 11/14*  (2019.01)
  *C02F 11/143* (2019.01)
  *C02F 11/147* (2019.01)

(52) U.S. Cl.
  CPC .............. *C02F 11/12* (2013.01); *C02F 11/13* (2019.01); *C02F 11/122* (2013.01); *C02F 11/127* (2013.01); *C02F 11/14* (2013.01); *C02F 11/143* (2019.01); *C02F 11/147* (2019.01)

(58) Field of Classification Search
  CPC ....... C02F 11/122; C02F 11/127; C02F 11/14; C02F 11/143; C02F 11/147; C02F 3/106; C02F 3/105; Y02W 10/10; Y02W 10/37
  USPC ........................................................ 210/615
  See application file for complete search history.

(56) References Cited

U.S. PATENT DOCUMENTS

| | | | |
|---|---|---|---|
| 5,230,794 A | 7/1993 | Heijnen | |
| 6,161,305 A | 12/2000 | Maier et al. | |
| 6,470,595 B1 | 10/2002 | Gaiser et al. | |
| 6,793,822 B2* | 9/2004 | Tay | C02F 3/1263 210/615 |
| 7,481,934 B2 | 1/2009 | Skillicorn | |
| 8,206,504 B2* | 6/2012 | Bethani | C04B 33/138 588/256 |
| 9,422,179 B2* | 8/2016 | Montalvo Martinez | C02F 3/2846 |
| 9,845,260 B2* | 12/2017 | Josse | C02F 9/00 |
| 2011/0079554 A1 | 4/2011 | Hongqiang et al. | |
| 2012/0285884 A1* | 11/2012 | Ahmad | C02F 3/107 210/603 |
| 2015/0108067 A1 | 4/2015 | Calhoun | |
| 2020/0031698 A1* | 1/2020 | Naider-Fanfan | C02F 3/341 |

FOREIGN PATENT DOCUMENTS

| | | | | |
|---|---|---|---|---|
| CN | 101538083 A | | 9/2009 | |
| CN | 104628135 A | | 5/2015 | |
| CN | 105036316 A | * | 11/2015 | ............ Y02W 10/10 |
| CN | 105906036 A | | 8/2016 | |
| CN | 205803101 U | | 12/2016 | |
| CN | 106495325 A | | 3/2017 | |
| CN | 107285467 A | | 10/2017 | |
| CN | 107487836 A | | 12/2017 | |
| DE | 19522164 A1 | | 1/1997 | |
| EP | 0319789 A1 | | 6/1989 | |
| JP | H01304098 A | | 12/1989 | |
| JP | 02107398 A | | 4/1990 | |
| JP | H-0985271 A | * | 3/1997 | ............ C02F 11/00 |
| JP | H-09174077 A | * | 7/1997 | ............ C02F 1/28 |
| JP | 2002336885 A | | 11/2002 | |
| KR | 20140023043 A | | 2/2014 | |
| WO | 2013149662 A1 | | 10/2013 | |
| WO | 2014128721 A2 | | 8/2014 | |
| WO | 2018145202 A1 | | 8/2018 | |

OTHER PUBLICATIONS

Agrawal et al., "Utilization of Dried Pelletized Anaerobic Sludge for Anaerobic Treatment of Wastewater," Journal of Fermentation and Bioengineering, Jan. 1, 1997 (Jan. 1, 1997), vol. 83, No. 1, pp. 91-95, XP055537473, Retrieved from the Internet: URL:https://doi.org/10.1016/S0922-338X(97) 87333-3 [retrieved on Dec. 21, 2018].

Lv et al., "Drying and re-cultivation of aerobic granules," Bioresource Technology, Elsevier, Amsterdam, NL, vol. 129, Jan. 4, 2013 (Jan. 4, 2013), pp. 700-703, XP028977056, ISSN: 0960-8524, DOI: 10.1016/J.Biortech.2012.12.178 p. 701-p. 702.

Kawan et al., "A Review on Sewage Treatment and Polishing Using Moving Bed Bioreactor (Mbbr)" Review Journal of Engineering Science and Technology, Aug. 1, 2016 (Aug. 1, 2016), vol. 11, No. 8 (2016) pp. 1098-1120, XP055568218, Retrieved from the Internet: URL:http://jestec.taylors.edu.my/Vol%2011%20issue%208%20August%202016/11 -8 -4.pdf, [retrieved on Mar. 13, 2019].

International Search Report and Written Opinion for International Application No. PCT/EP2019/052091 dated Mar. 20, 2019.

H. Odegaard et al., "A New Moving Bed Biofilm Reactor—Applications and Results," Wat. Sci. Tech. vol. 29, No. 10-11, pp. 157-165, 1994.

Study on Sewage Treatment with NASF-MBBR, Gong Liying et al., Environmental Science & Technology, vol. 40, No. 12, Dec. 2017, pp. 193-197 and English abstract.

* cited by examiner

BIOFILM CARRIER MEDIA IN MOVING BED BIOFILM REACTOR PROCESSES

This application is a national phase of International Application No. PCT/EP2019/052091 filed Jan. 29, 2019 and published in the English language, which claims priority to Swedish Application No. 1850094-2 filed Jan. 29, 2018, both of which are hereby incorporated herein by reference.

FIELD OF THE INVENTION

The present invention relates to carrier elements for growth of biofilm thereon, wherein said carrier elements are designed to flow freely in a liquid to be purified from contaminants biologically by said growing biofilm.

BACKGROUND OF THE INVENTION

It is known that in biological treatment of water or wastewater, the water is passed through some type of reactor or several reactors (a vessel or another space) wherein micro-organisms are utilized for converting pollutants in the water to harmless end products such as carbon dioxide and water. The treatment can be performed under supply of air (aerobically) or without supply of air (anaerobically) or without supply of air but with presence of significant amounts of nitrate (anoxically). In order to increase the efficiency of the treatment process, it is common to aim at a high content of active microorganisms in the process by preventing such organisms to escape together with the treated water, either by allowing the micro-organisms to grow suspended in the reactor and separating them from the water in a separation stage after the reactor and returning the micro-organisms to the reactor (e.g. the activated sludge process), or by introducing some kind of support material into the process on the surfaces of which the micro-organisms can grow as a biofilm and thus be retained in the process (the biofilm process). There are also mixtures of these two process types, referred to as hybrid processes, wherein the support material is introduced into the activated sludge process so that suspended micro-organisms as well as biofilm growing microorganisms can be utilized in the process.

The biofilm process has a number of advantages compared to the activated sludge process. Higher organic loading rates can be applied and the biofilm process is much more robust towards variations and disturbances. Most conventional biofilm processes contain packed immobile carrier bodies in the reactor on which biofilm can grow. The fix carrier bodies can become clogged or blocked by biofilm growth or other solid material in the reactor and thereby create so called dead zones where the contact between the microorganisms in the biofilm and the water to be treated is highly limited.

The Moving Bed Biofilm Reactor (MBBR) is another type of biofilm process in which movable specifically designed carrier material, often in the form of a plastic body, with a protected surface for biofilm to grow is kept in suspension either by aeration or by mixers depending on if the process is to be aerobic, anaerobic or anoxic. The carrier material on which the microorganisms grow can be kept in the process by passing the effluent water through a strainer or sieve with a smaller diameter than the carrier material. Compared to the fixed film process the MBBR process gives an advantage in terms of collisions between the mobile carrier material in suspension which significantly limits the possibility of clogging and creating dead zones where no treatment occurs which is a common problem for fixed film processes.

The specifically designed carrier media utilized in MBBR technologies generally require utilization of plastic material and processing by extrusion to produce the specific plastic carrier media pieces. The plastic raw material utilized and the plastic processing generate drawbacks to existing MBBR technology which are:

Production of specifically designed plastic carriers is expensive thereby making the carrier media a significant cost of the MBBR process;

Designing plastic carriers to provide protected surface area reduces the total active area that can be provided per $m^3$ since openings for protected surface need to be included in the design of the carriers. The protected surface area is necessary for these plastic carriers moving in suspension since the biofilm grown on the outer surface is not protected from shear forces arising from collision between carrier elements and the reactor walls and will therefore be scratched off the unprotected surface and be flushed out with the effluent from the reactor; and Although marginal in comparison to global plastic pollution, loss of plastic carrier media either through formation of micro-plastics by carrier shear or loss of whole carriers from wastewater treatment plants into marine environments is a possibility. Environmental legislation against the use of plastics in various applications and markets is always an underlying threat to which the MBBR technology at date could be vulnerable.

Polyethylene or another similar synthetic polymer, polypropylene, are generally used for production of carrier media because of its lower price compared to other synthetically produced polymers, being commodity polymers of high volume, its high durability and simple processing into moulded and shaped objects such as for example carrier elements of a specific design for wastewater treatment processes. Polyethylene and polypropylene constitute carbon and hydrogen in long chains making the material highly hydrophobic and inert in aquatic environments such as wastewater treatment plants.

Apart from MBBR technology utilizing specifically designed plastic carrier elements other prior art also exists utilizing non-plastic carrier elements. U.S. Pat. Appl. Publ. US 2015/0108067 A1 describes a fluid treatment process that includes a contactor, an aerator and a separator. The fluid is mixed with a powdered natural lignocellulosic material ("PNLM"), a microbial growth inoculum and at least a portion of the fluid in the contactor to provide a mixture that includes an established, acclimated microbial growth in the fluid. The mixture is introduced to an aerator where binding through adsorption of at least some of the one or more substances to the PNLM and additionally physiological uptake by microbial growth on the PNLM reduces the concentration of contaminants in the wastewater. The process is not a MBBR process since the carrier elements are not always retained within the bioreactor volume.

PCT/CA2018/050136, published after priority date of the present application, refers to compositions for inoculation (the transfer of living microorganisms). A first composition comprising archaea microorganism granules for bioaugmentation for treatment of COD in wastewater, and a second composition of activated silicate beads that allow removal of phosphate, nitrogen and suspended solids. The mixture of both compositions act synergistically by promoting organic matter degradation and allowing the removal of phosphate without consuming alkalinity of the treated solution.

U.S. Pat. No. 7,481,934 also makes use of powdered lignocellulosic material, such as kenaf fibers, to work as both a biodegradable adsorbent and media for biofilm growth when combined with suspended growth in an activated sludge system for treatment of wastewater. The media with biofilm growth is allowed to settle in a liquid-solid separation unit together with suspended biomass from the activated sludge. The biofilm media and suspended biomass are thereby separated from the treated water. In other cases, but not necessarily, some biofilm and suspended growth are returned to the activated sludge reactor inlet using a returned activated sludge stream for an additional treatment cycle. This invention aims to; (a) add mobile powdered kenaf to physically remove colloidal and suspended volatile solids through adsorption onto the powdered kenaf to enhance floc formation and settling during pre-treatment; (b) adsorbing toxic substances and elements onto the kenaf fiber that interfere with the activated sludge biological process and thereby reduce their exposure to activated sludge organisms in suspension; (c) providing fixed surface in activated sludge wastewater treatment bioreactors for bacteria and other organisms favouring attached growth; (d) reduce the production of biological sludge while also helping to maintain treatment efficiencies and enhancing the settling characteristics of sludge. The process is not a MBBR process since the carrier elements are not always retained within the bioreactor volume.

The outer layer of the cell wall of various bacterial species such as gram-negative bacteria and gram-positive bacteria contain either peptidoglycan and lipoteichoic acid (gram-positive) or lipopolysaccharides (gram-negative). Interactions between a surface and bacteria are governed by intermolecular forces such as hydrogen bonding, dipole and ionic interactions, hydrophobic and hydrophilic and other electrostatic interactions.

Hydrogen bonds cannot be achieved having carbon and hydrogen as the only constituents of the media surface as is the case for polyethylene as used in the production of most available MBBR carrier media. This material is highly hydrophobic in its nature allowing for poor wetting in water and therefore lower surface availability for bacteria to attach to. Polyethylene also does not allow for hydrogen bonding between the carrier media surface and the bacterial outer layer.

Hence, an improved carrier for an MBBR process made from a non-plastic material would address the problem of plastic pollution, preferably using a material with excellent surface properties for microbial activity which allows for cost-effective production and use.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a bio-carrier to carry a biofilm in a moving bed biofilm reactor (MBBR), the carrier being a particle comprising dehydrated sludge.

Also provided is a the use of a bio-carrier in a MBBR process to purify a liquid from contaminants, the MBBR process utilizing a MBBR system comprising at least one bioreactor, the bioreactor being continuously or intermittently aerated and/or mixed, wherein the bio-carrier is retained within the at least one bioreactor, the bio-carrier being kept in suspension and in movement, either continuously or intermittently, in the liquid to be purified by aeration and/or stirring of the liquid to be purified, and wherein the bio-carrier provides a surface for biofilm growth.

Furthermore is provided a method of manufacture of a bio-carrier comprising the steps of: (i) dehydrating sludge to a total dry solids content of more than 65 wt.-%, preferable more than 80 wt.-%, or more preferable more than 90 wt.-%; and (ii) forming the dehydrated sludge into particles, and (iii) characterizing the particles from step (ii) and, based on the characterization, selecting bio-carriers for use in carrying a biofilm in MBBR process.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Figure 1:
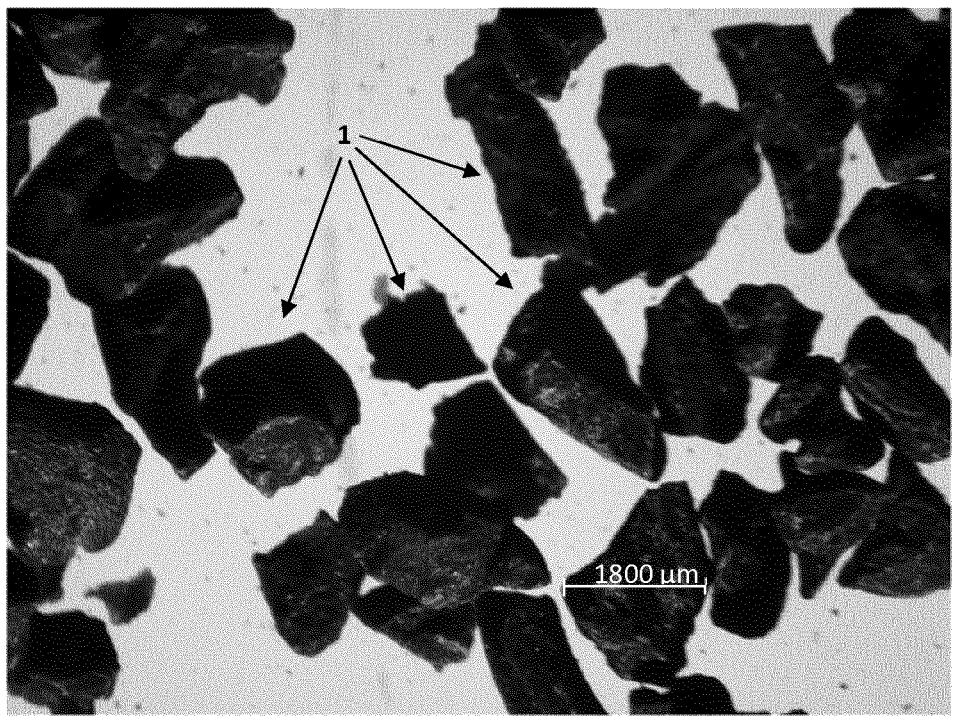
FIG. 1 is a microscopic view of bio-carrier (1) elements produced by dehydrating an industrial activated sludge having surfaces for biofilm growth before being deployed in the bioreactor.

The following description focuses on an embodiment of the present invention applicable to a carrier element suitable for use in a Moving Bed Biofilm Reactor (MBBR) processes, which prevents leakage of synthetic plastics, offers high surface availability and rapid microbial attachment and growth thereon.

There are several different classes of materials that can be considered as alternatives to plastic. However, a carrier element suitable for use in a Moving Bed Biofilm Reactor (MBBR) processes must possess several different qualities. Carrier materials of interest for such applications would preferably have a molecular structure capable of bringing biofilm growth to the material; would have a small enough weight to limit the particle impact energy and thereby avoid shrugging of grown biofilm; would have enough structural integrity not to dissolve or being pulverized by shearing when subjected to aeration and/or mixing in wastewater; would have a specific settling velocity range by controlling its mass within which the settling velocity is low enough be suspended through aeration and/or mixing in a water volume in a satisfactory manner but at the same time high enough settling velocity to settle quickly in a water volume; have a high active surface for a specific bulk volume of carrier elements. Ideally, the carrier material would also be biodegradable and present in the circular economy of wastewater or solid waste treatment services.

In the invention, it was envisioned that materials fulfilling these criteria could be various types of semi-products from organic biomass production. Among many potential candidate materials, one valid source was found to be the excess sludge produced in biological wastewater treatment. Sludge is a solid waste product from for example biological wastewater treatment, has a natural molecular structure for bacteria to attach and bond strongly to and may also naturally contain nutrients aiding further bacterial growth. However, sludge is usually simply dewatered and discarded, and since sludge material is totally different in composition from classical MBBR carriers (usually made out of plastic), it was completely unexpected that sludge could successfully be used as an MBBR carrier element. Furthermore, in waste water treatment sludge is normally only dewatered up to a point which can be warranted from a cost perspective (since dewatering and drying takes time and uses energy), why the dried sludge particles of the invention is generally not found in a normal waste water treatment plant. It was found that when drying the sludge, having organic and inorganic content, the properties of the dried sludge particles differ substantially in properties from any of the wet or dewatered sludge normally used in a waste water treatment process.

Sludge is a semi-solid slurry comprising liquid water, organic solids and inorganic solids stemming from the separation of solids from liquid in, but not limited to, water and/or wastewater treatment. By dehydrating the sludge to a high enough degree, its structural integrity was found to become strong enough to keep its shape in an aerated and/or mixed water volume without dissolving its main structural components or being sheared into micro-particles. Thus, in the invention, carriers made from dehydrated sludge are used as carriers in an MBBR process. Thereby plastic processing and plastic materials can be avoided, resulting in both substantial environmental gain and significant lowering of the cost of the carrier media.

In one embodiment, a bio-carrier 1 to carry a biofilm 2 in a moving bed biofilm reactor (MBBR), the carrier being a particle comprising dehydrated sludge.

Industrial and municipal wastewater treatment plants produce solids that are also referred to as sludge, whether generated from biological or physical-chemical processes.

Sludge can also be generated at organic solids treatment plants working with organic solid waste and/or other biomaterials. Examples of such plants include anaerobic digesters for gas production, a collection of processers by which micro-organisms break down biodegradable materials in the absence of oxygen. It is used for industrial, agricultural or domestic purposes to manage waste or to produce renewable energy.

In one embodiment, the dehydrated sludge is comprised of sludge from a water purification process or an organic solids treatment process.

Sources of sludge include, but are not limited to, primary sludge from a municipal wastewater treatment plant, secondary sludge from a municipal or industrial wastewater treatment plant or digested primary, secondary or tertiary sludge at municipal or industrial wastewater treatment plants.

In one embodiment, the sludge is primary, secondary or tertiary sludge from a municipal or industrial wastewater treatment process or any combination thereof and/or digested sludge from an organic solids treatment process. In one further embodiment, the sludge have been digested in an anaerobic or aerobic digester.

Sludge, sewage sludge, biological sludge or biomass sludge produced by bacteria, is a natural bi-product or waste material that needs to be taken care of and disposed of. It can therefore make up a cheap raw material thereby significantly reduce the cost of MBBR processes compared to if utilizing the industry standard of man-made synthetic materials such as polyethylene and polypropylene. Since it is a natural bi-product made by bacteria it is also naturally biodegradable if accidently lost into the environment. Indeed, in many countries excess sludge is used as a nutrient source on agricultural land.

In FIG. 1, a microscopic view of such bio-carrier 1 elements produced by dehydrating an industrial activated sludge is shown. In FIG. 2, a microscopic view of bio-carrier elements produced by dehydrating a digested municipal sludge is shown. As can be seen, very different types of sludge can still form particles suitable for being MBBR bio-carriers, with more examples below (such as in FIG. 13). This is shown in more detail below.

When dehydrating the sludge, its surface also becomes rough which makes it ideal for biofilm attachment, forming small compartments or irregularities promoting effective microbial attachment and growth. To ensure as high active surface area as possible and to have good aeration and/or mixing of the bio-carrier 1 in the water volume, the dehydrated sludge can be formed into particles which should be within a certain weight range. A certain minimum particle mass is required for the dried sludge particles to keep its structural integrity at the same time as keeping good enough settling properties for solid-liquid separation of carrier particles and purified liquid. The settling velocity of the particle needs to be low enough to be able to aerate and/or mix in a water volume in a satisfactory manner but at the same time high enough to settle quickly in a water volume. As derived from FIG. 12 and Example 5, the optimum weight is in the range of 0.1 to 100 mg, preferably 0.5 to 30 mg based on the optimum particle settling velocity determined in Example 5.

In one embodiment, the particle has a weight of 0.1 to 100 mg, preferably 0.5 to 30 mg.

The characteristics of the bio-carrier 1 are also related to its volumetric mass density. It needs to be high enough to sink in water. However, it also needs to be low enough to flow freely in suspension in a bioreactor 10 volume upon aeration and/or mixing. The volumetric mass density of suitable bio-carrier 1 particles was determined with the aid of ethanol (99.9 vol-%) of known density at a given temperature and atmospheric pressure. The bio-carrier 1 particles were first weighed in air (A) and then in the liquid (B). The volumetric mass density of the solid bio-carrier 1 particles $\delta_p$ was then calculated, as further described in Example 2. As derived from FIG. 12 and Example 2, the optimum volumetric mass density is in the range of 1.01 to 2.5 g/cm$^3$, preferably 1.02 to 1.8 g/cm$^3$.

In one embodiment, the particle has a volumetric mass density of 1.01 to 2.5 g/cm$^3$, preferably 1.02 to 1.8 g/cm$^3$, as determined by weighing the particle in air and then in ethanol (99.9 vol-%) at 20° C. and 1 atm.

However, the particle size and shape of the bio-carrier 1 element will also affect the settling properties and the ability of the bio-carrier 1 element to flow freely in a liquid upon aeration and/or mechanical mixing. If the settling velocity of the bio-carrier 1 particles is too high (above a maximum settling velocity, $v_{max}$) it will not be possible to keep the particles in suspension through aeration and/or mixing in suspension in the bioreactor 10, at least not without using a very high energy intensive aeration or mixing. At the same time, the size of the bio-carrier 1 particle cannot be too small as this will result in a low settling velocity, which will prevent settling of the bio-carrier 1 in specific gravity dependent phase seperators 16 as showed in FIGS. 6 and 8. Settling velocity is not crucial when the process is operated with phase seperators 16 as showed in FIG. 7 but also here is a too small particle size will be disadvantageous as screen 15*a*/sieve 15*b*/filter 15*c*/membrane 15*d* openings must be small to retain the bio-carrier 1 with a low screen 15*a*/sieve 15*b*/filter 15*c*/membrane 15*d* throughput as well as increased risk for clogging as a result. In the invention, the settling velocity was measured in a falling-sphere viscometer experiment. In Example 3, and summarized in FIG. 12, fall velocity was measured for a number of different particle masses and materials as a function of particle mass, such as dehydrated municipal digested sludge, dehydrated food waste biomass and recycled PVC (polyvinylchloride). It was found that the optimum settling velocities as determined in Example 5 were in the range of 0.02 m/s to 0.4 m/s, preferably 0.05 m/s to 0.2 m/s and therefore the optimal particle mass range could be determined from FIG. 12.

To determine that the lower limit of the optimal settling velocity range for use in an MBBR process, particles having a wide range of measured settling velocities (0.1, 0.15, 0.20, 0.25 and 0.30 m/s when measured according to Example 3) were accumulated in five separate bulk volumes and tried in an MBBR process. It was found that the bioreactors 10 containing bio-carrier 1 elements with settling velocity characteristics of 0.01 and 0.03 m/s had lost 75 and 50% of carrier elements respectively) while the bioreactor containing carrier bio-carrier 1 elements with a settling velocity characteristic of 0.05 m/s had lost 10% of bio-carrier 1 elements as according to Example 5.

To determine the upper limit of the optimum settling velocity range for use in an MBBR process, particles having a wide range of measured settling velocities (0.1, 0.15, 0.20, 0.25 and 0.30 m/s when measured according to Example 3) were accumulated in five separate bulk volumes, with particles having the same settling velocities in the same bulk volume, corresponding to 15% of the volume. By measuring the fill rate in a water sample taken at the top of the aerated volume it could be seen for what particle settling velocity, the fill rate in the taken sample from the top was below 5%. This settling velocity was determined to be 0.2 m/s when measured as in Example 3 and determined according to Example 5.

Thus, in one embodiment, the particle has a settling velocity in the range of 0.02 m/s to 0.4 m/s, preferably 0.05 m/s to 0.2 m/s in denatured ethanol (99.9 vol.-% ethanol) at 20° C. and 1 atm.

As further described in Example 4, the size of the bio-carrier 1 element could be extrapolated from the falling-sphere viscometer experiments. This is summarized for different materials with different volumetric mass densities in FIG. 13. The nominal particle diameter (D) in the present invention is referred to as the diameter of a sphere having the same volume as the non-spherical bio-carrier 1 element. The nominal particle diameter (D) is a suitable definition, since the bio-carrier 1 element is generally irregularly shaped to some extent.

Figure 13:
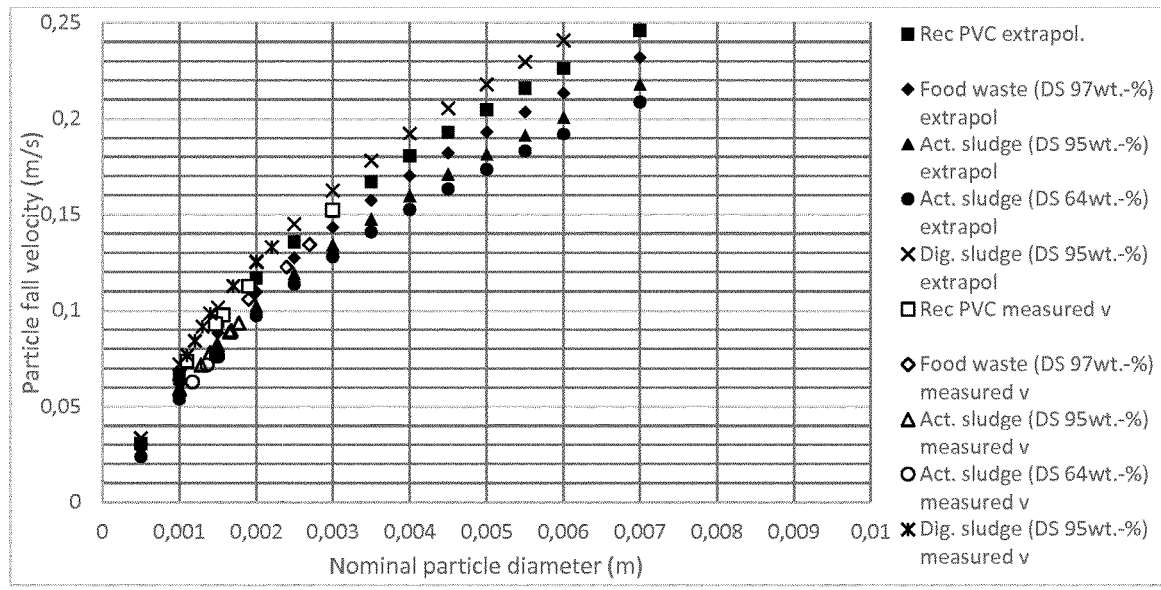
FIG. 13 is a diagram showing the fall velocity of various bio-carrier elements in ethanol (99.9 vol.-%) at 20° C. and atmospheric pressure as a function of the individual particle mass of each bio-carrier element.

A bio-carrier 1 element suitable for MBBR processes is a material unit with a nominal diameter of 0.5 to 10 mm, preferably 0.7 to 7 mm, or even more preferably 1 to 4 mm having surfaces on which microorganisms can form a biofilm 2 and which possible to suspend, keep in movement and retain in a liquid volume that is to be treated from contaminants, as can be seen in FIG. 13 where the optimal nominal particle size range can be determined from the optimal settling velocity range determined above and as shown in Example 4.

Thus, in one embodiment, wherein the particle has a nominal diameter of 0.5 to 10 mm, preferably 0.7 to 7 mm, and even more preferably 0.9 to 4 mm. If using a bio-carrier 1 material that has the possibility of forming stronger attractive forces between bacteria and bio-carrier 1 surface, the rate of bacterial growth could possibly be significantly enhanced. Also the formed intermolecular bond would be significantly stronger leading to less shaving of biomass in an aerated volume of bio-carriers 1.

For traditional MBBR carriers, bacterial attachments between the bacteria and a carrier media surface of polyethylene is lower compared to carrier materials allowing for hydrogen bonding, as is the formed strength of intramolecular bonding. Contrary to this, the sludge particles have a have a molecular structure capable of forming hydrogen bonds and other molecular forces with the biofilm 2 in solution. This allows stronger attractive forces between the microbes and carrier surface. At the same time the sludge particles may contain nutrients that are dissolved in the water further aiding microbial growth on the sludge particle.

Figure 16:
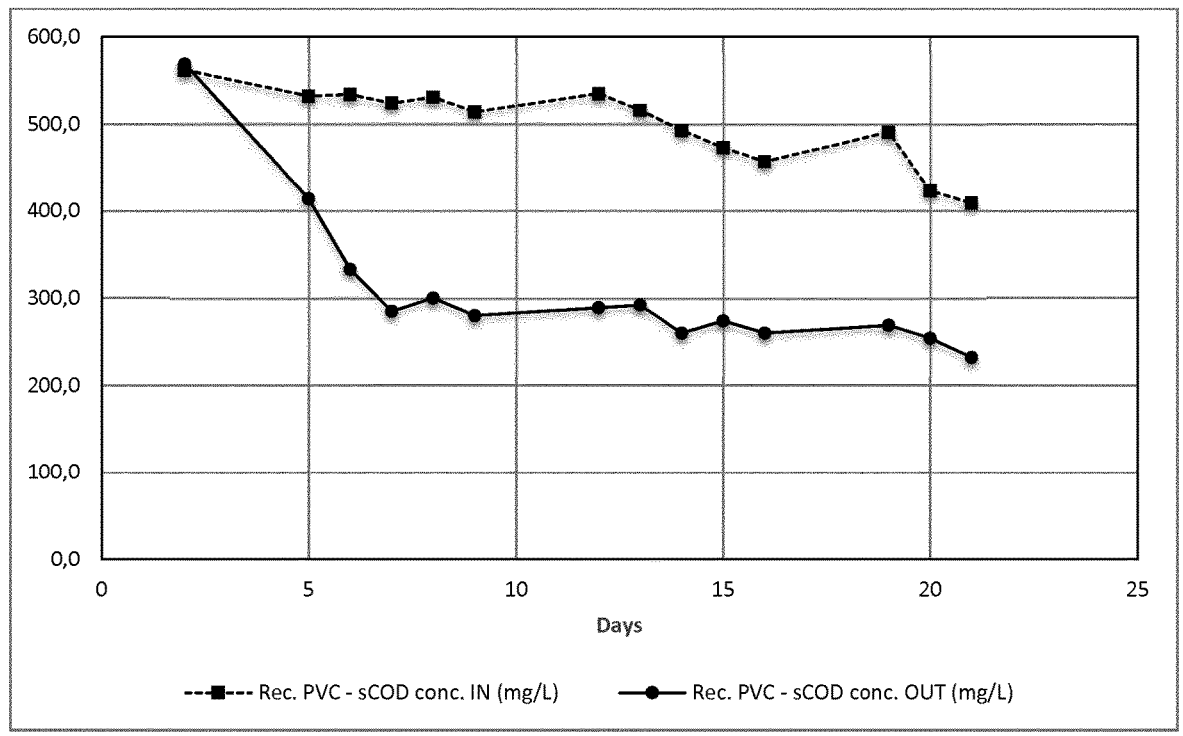
FIG. 16 is a diagram showing the soluble COD concentration in an industrial wastewater and in the purified liquid as a function of days in a MBBR process utilizing recycled polyvinylchloride particle as carrier elements and operated with continuous flow and aeration with a phase separator at the outlet of the bioreactor to retain the bio-carrier elements in the bioreactor.

Without being bound by theory, it may be hypothesised that this contributes to the high rate of microbial growth on the bio-carriers 1 observed after a short time in the bioreactor 10 compared to traditional MBBR carriers, as shown in FIG. 16. FIG. 16 shows the results of influent and effluent soluble COD concentrations in the bioreactor 10 during 150 days of operation utilizing one type of bio-carrier 1 elements. It is illustrated that for the bio-carriers 1 of the invention, stable soluble COD removal (in excess of 90%) could be achieved after only 5 days of operation, while when using conventional HD-polyethylene plastic media, it may take as much as 10-15 days obtain stable and high COD removal, after wetting has occurred.

Figure 3:
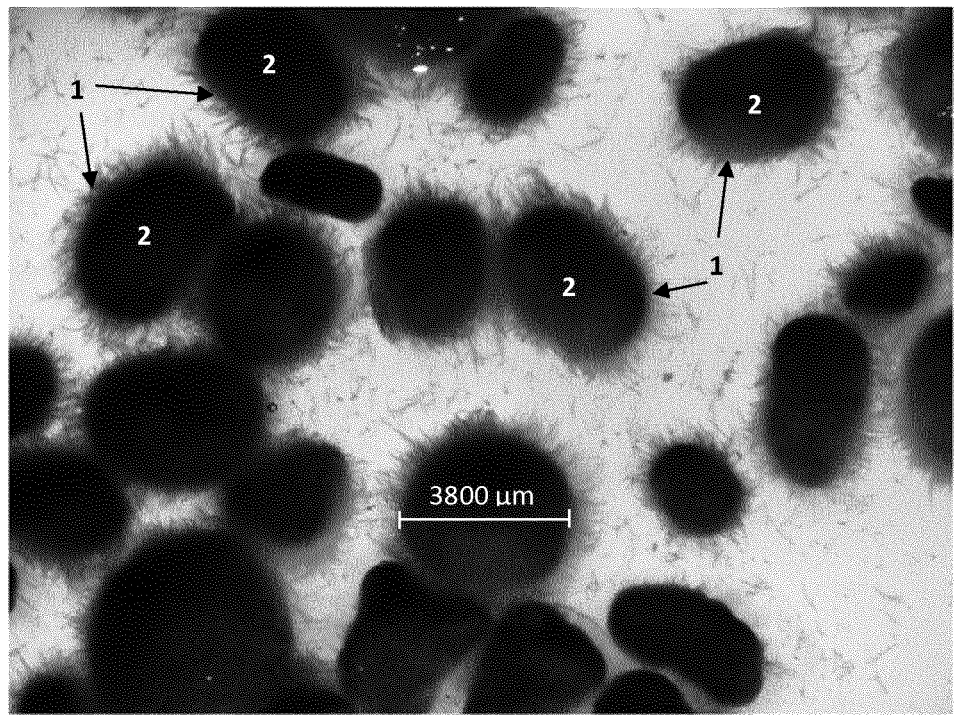
FIG. 3 is a microscopic view of bio-carrier (1) elements produced by dehydrating industrial activated sludge having a certain biofilm (2) growth thereon during operation in the bioreactor.
Figure 4:
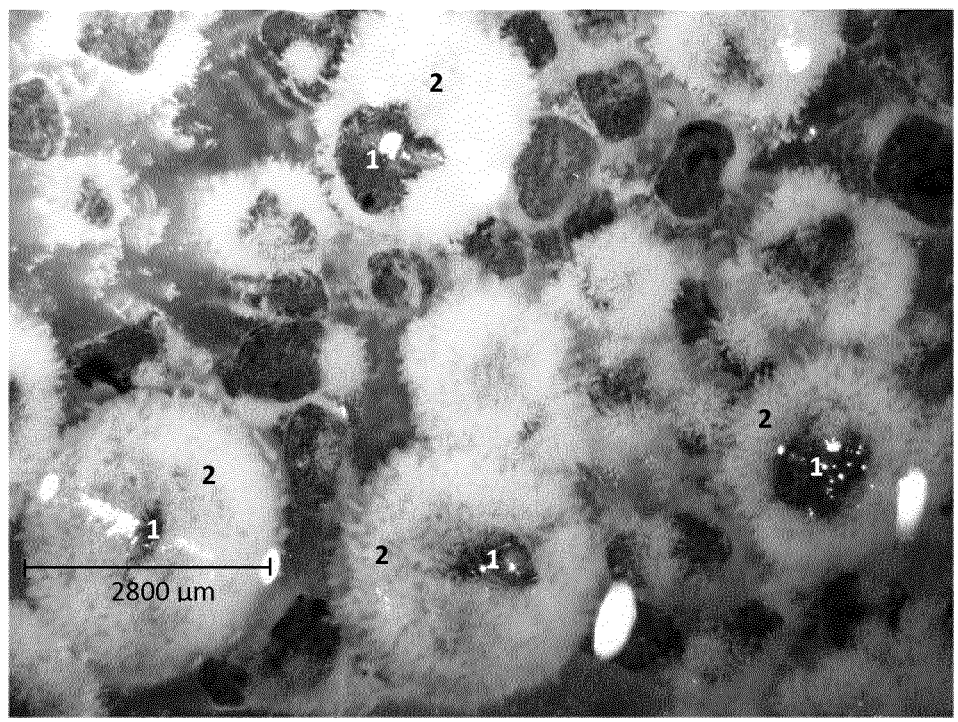
FIG. 4 is a microscopic view of bio-carrier (1) elements produced by dehydrating a digested municipal sludge having a certain biofilm (2) growth thereon during operation in the bioreactor.

FIGS. 3 and 4 show two different examples of biologically active microbes grown in the form of a biofilm 2 on the bio-carrier 1 element surfaces after the bio-carriers 1 have been kept in suspension by aeration in a MBBR process bioreactor 10. In the reactor 10, the microbes growing on the bio-carrier 1 elements are treating the wastewater being fed to the bioreactor 10.

Another advantage of the bio-carriers 1 of the invention was found to be the softening of the sludge particle when put in contact with water. This differs from traditional MBBR carriers, which are made from a hard material inert in water, and benefit from having protected surfaces which can protect biofilm 2 from abrasion from other carriers or hard surfaces. Instead, in the invention, it was found that collisions between bio-carriers 1 softened by prolonged exposure to water would not be as harsh, and thereby shave off less biofilm 2. Also the small particle size of bio-carrier 1 elements significantly contributes to low impact collisions compared to traditional MBBR carriers which are much larger in size. These factors combined results in that there is no need for protected surface areas, and instead allows for the bio-carriers 1 to only have a high total active surface area thereby no need for creating specific shapes and forms using plastic processing.

The bio-carrier 1 element may have a water content between 0 and 50 weight-%, more preferably between 2 and 40 weight-% or even more preferably between 5 and 30 weight-% according to Example 6. A water content higher than 30 weight-% is possible and still having effective bio-carrier 1 elements in MBBR applications, but there may be problems arising in the product handling and storage. Also, the weight will be higher for a wetter bio-particle 1, which results in higher transport costs if the particles are manufactured at a central point and transported to usage sites. However, for local use, the contrary may be true since drying is also an energy-consuming step, why a water content of 35 to 50% may be warranted if the particles are to be used directly without transportation.

In one embodiment, the bio-carrier 1 particle comprises a water content between 0 and 50 weight-%, more preferably between 2 and 40 weight-% or even more preferably between 5 and 30 weight-%, as measured as water content fraction of the particle on total mass basis.

For wastewater sludge, the ratio of inorganic and organic components may be about 1:1 (dry weight). However, for different sludge types this may vary to a great extent, as can be seen in Example 3. The bio-carrier 1 element may contain an inorganic content between 0 and 90%, preferably between 0.5 and 60% measured as ash content fraction of the particle on dry mass basis according to Example 6. Sludge raw material suitable for production of bio-carrier 1 elements for use in MBBR as according to the present invention meet these requirements. Typically, a composition comprising a higher amount of inorganic material leads to higher density of the particle, resulting in a smaller particle if it is suitable for use in MBBR processes. However, porous inorganic materials also exist, and incorporation of such porous materials may have the opposite effect, why an inorganic content of up to 90% is possible. Inorganic materials may also contain trace elements, which have a positive effect to biomass growth.

In one embodiment, the bio-carrier 1 particle has an inorganic content between 0 and 90 weight-%, preferably between 0.5 and 60 weight-%, as measured as ash content fraction of the particle on dry mass basis.

The bio-carrier 1 element may contain an organic content between 10 and 100%, preferably between 40 and 99.5% measured as ash content fraction of the particle on dry mass basis, according to Example 6. The organic material is usually of lower density than that of inorganic components. The organic material also plays a role in increasing the mechanical strength of the bio-carrier 1. Furthermore, the mix of the inorganic and organic material on the surface of the particles provide a surface ensuring fast growth rate and hydrogen bonding to the biofilm 2. Therefore, an organic content of at least 10% in preferred.

In one embodiment, the bio-carrier 1 particle has an organic content between 10 and 100 weight-%, preferably between 40 and 99.5 weight-%, as measured as ash content fraction of the particle on dry mass basis.

Upon use in an MBBR process, the particle will be wetted and slowly start to soften. Contrary to be being a disadvantage, it was found that the softer particle seems to promote the growth of biofilm 2, possibly due to the organic and inorganic content of the particle being used as nutrients for the microorganisms growing on the surface of the particle. Furthermore, the softer particle seems to minimize any damage from collisions between particles, further facilitating an even biofilm 2 growth upon the particles. This results in a rapid establishment of biological activity compared to the activity achieved on a plastic material. In comparison with a rigid plastic particle (see example 11 and FIG. 16), a high biological activity is quickly established on the bio-carrier 1 element, whereas only a limited biological activity is slowly established on the plastic particle. This is most likely due to the stronger biofilm 2 bonding to the surface due to strong intermolecular bonds and the less chafing due to particle softening of the bio-carrier 1 compared to the rigid plastic particle enabling lower impact collisions.

Figure 22:
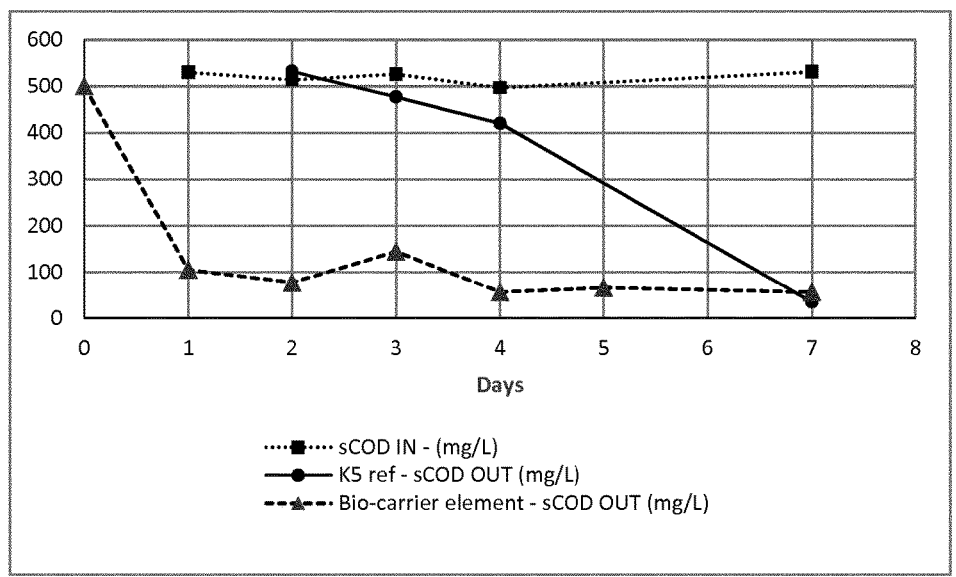
FIG. 22 is a diagram showing the soluble COD concentration in an industrial wastewater and in the purified liquid as a function of days in a MBBR process utilizing traditional polyethylene plastic based carrier media with protected surface area (K5) and bio-carrier elements when operated with continuous flow and aeration.

In additions to this, example 16 and FIG. 22 also highlight that biological activity is sooner established on the bio-carrier 1 element compared to a traditional plastic MBBR carrier element and this shows that the bio-carrier 1 has a surface more suitable for biofilm 2 establishment. However, the final biological activity is similar in this case as the plastic carrier element has a protected surface. From this, it is concluded that biofilm 2 chafing on the bio-carrier 1 is not significant.

Upon use in an MBBR process, the bio-carrier 1 particle density will also slowly change, mostly due to the increasing water content of the particle and biofilm 2 growth thereon. This can be seen in Example 8, wherein the settling of colonized and sheared bio-carrier 1 elements is investigated. It is seen that despite wetting and significant biofilm 2 growth the settling velocity is still high enough to for it to be suitable for use as carrier elements in MBBR processes thanks to that the bio-carrier 1 element settling velocity has been selected to take into account the change in properties upon application in the MBBR process.

A Moving bed biofilm reactor (MBBR) is defined as a method for treatment of a liquid, such as wastewater, utilizing a carrier element suitable for MBBR processes, which is kept in suspension and in movement either continuously or intermittently in the liquid to be purified from contaminants in one or several bioreactor 10 volumes and/or zones in which the carrier elements are retained. An MBBR system comprising at least one bioreactor 10 which is aerated and/or mixed. The mixing can be as simple as mechanical stirring. In the bioreactor 10 volume, wherein the bio-carrier 1 is retained within the at least one bioreactor 10, the bio-carrier 1 is kept in suspension and in movement, either continuously or intermittently, in the liquid to be purified by aeration and/or mixing. Thereby, the retained bio-carriers 10 provides a large and suitable surface for biofilm 2 growth enabling efficient water purification. Examples of bioreactors 10 with different volumes or zones are illustrated in FIG. 5, where 5a shows a single volume bioreactor 10, 5b shows a dual volume bioreactor 10 and 5c shows duals zone bio-reactor 10.

The liquid to be purified may commonly be referred to as liquid to be treated, wastewater or influent. The purified liquid may be referred to as treated water, treated liquid or effluent. Contaminants to be degraded by the retained microorganisms primarily include organic, nitrogen and phosphorus components in soluble, colloidal or particulate form. However, microorganisms may degrade or adapt to other contaminants as well.

In one embodiment, a bio-carrier 1 is used in an MBBR process to purify a liquid from contaminants, the MBBR process utilizing a MBBR system comprising at least one bioreactor 10, the bioreactor 10 being continuously or intermittently aerated and/or mixed, wherein the bio-carrier 1 is retained within the at least one bioreactor 10, the bio-carrier 1 being kept in suspension and in movement, either continuously or intermittently, in the liquid to be purified by aeration and/or stirring of the liquid to be purified, and wherein the bio-carrier 1 provides a surface for biofilm growth 2.

Figure 5:
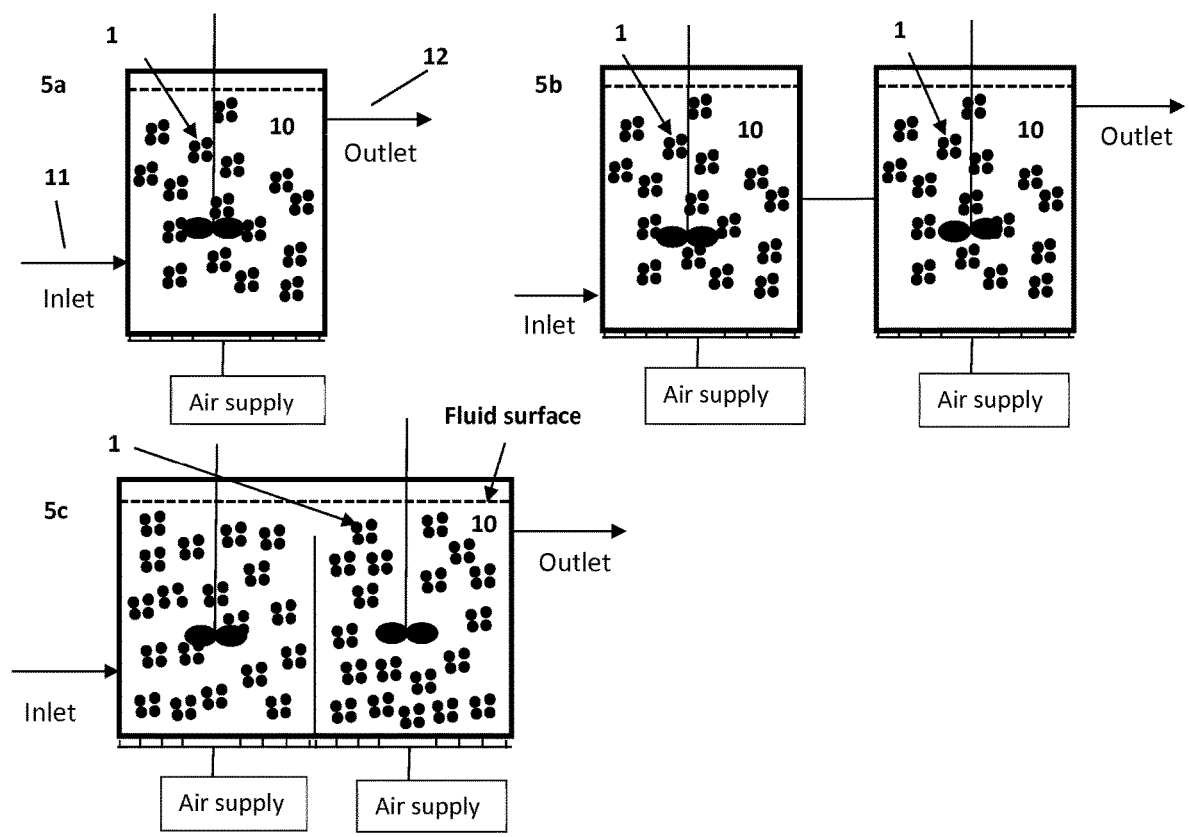
FIG. 5 is a schematic perspective view of MBBR processes employing one or several connected and contained volumes or zones described as bioreactor (10), where carrier (1) elements for biofilm growth thereon are retained and kept in suspension by aeration and/or mixing to treat a wastewater from contaminants.

In FIG. 5, typical schematic drawings of a bioreactor 10 utilized in an MBBR processes is shown. The bio-carrier 1 elements are deployed in the bio-reactor 10 and kept freely flowing in suspension by gas aeration and/or mixing. Mixing can be achieved by a wide variety of methods such as mechanical stirring or pumping of the water in the bioreactor 10. Wastewater is continuously or sequentially fed to the bioreactor 10 from one or several well defined inlets making bacteria grow on the bio-carrier 1 element surface. After a certain retention time in the bioreactor 10, the purified liquid is continuously or sequentially emptied out of the bioreactor 10 through one or several well defined outlets 11 while retaining the bio-carrier 1 elements in the bioreactor 10.

This schematic does not include to show any type of method or device to retain the bio-carrier 1 elements in the bioreactor 10.

In one embodiment, the bioreactor 10 is a vessel comprising one or several connected volumes or zones, in which biological activity is promoted, and one or several inlets 11, for providing liquid to be purified, and one or several outlets 12 for withdrawing purified liquid, and one or several aerator(s) 13 and/or mixer(s) 14.

Figure 6:
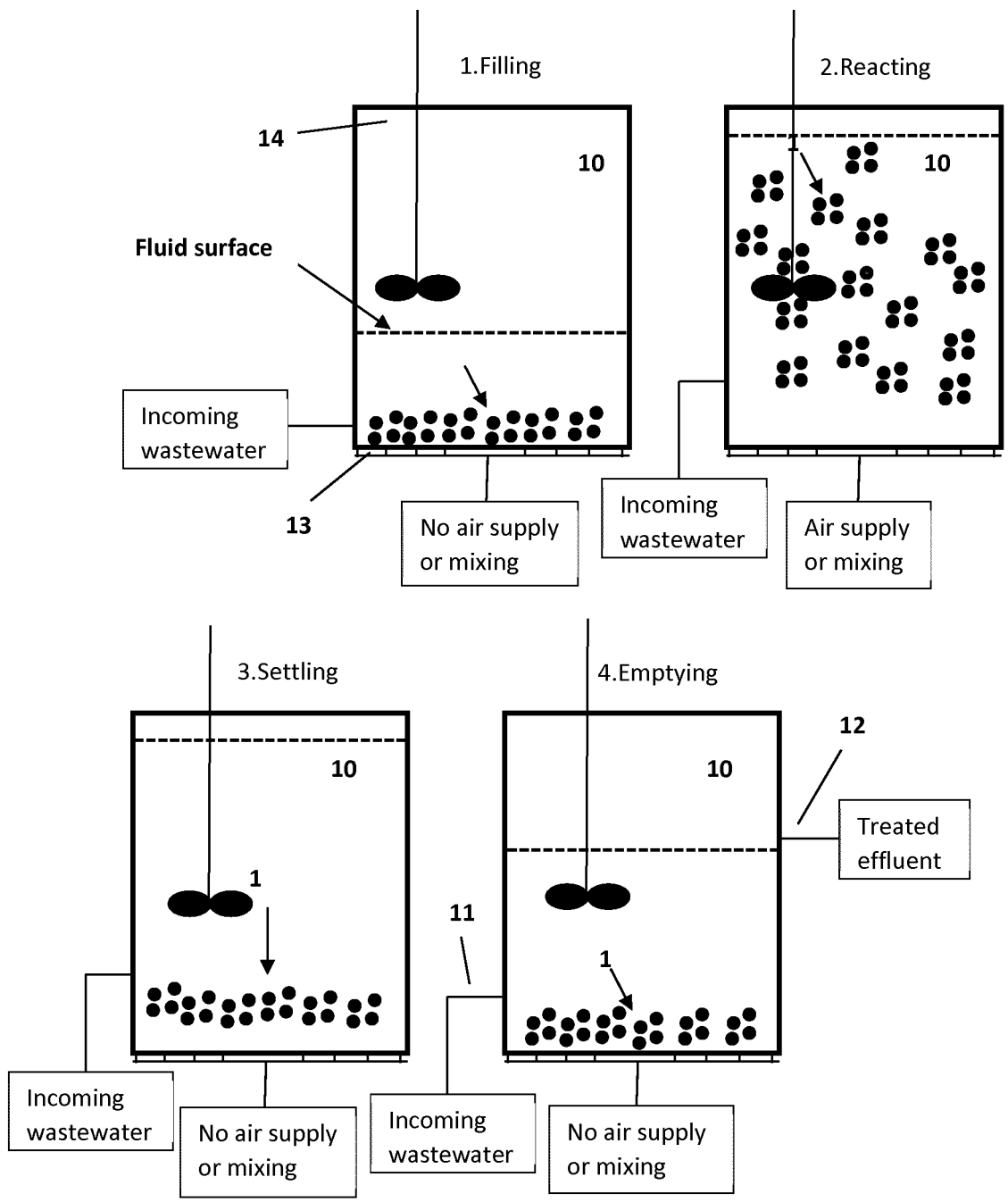
FIG. 6 is a schematic perspective view of an MBBR process run in sequential phase separation mode repeating four phases of sequential filling (can also be done continuously), reacting, settling and emptying and repeating the phases of reacting, settling and emptying to retain the bio-carrier (1) elements in the bioreactor (10)

FIG. 6 shows a method of sequential operation for a MBBR employing bio-carrier 1 elements. By running the bioreactor 10 with sequential operation it is possible to retain at most of the carrier elements in the bioreactor 10. In the example of FIG. 6, during the fill phase wastewater is fed to the reactor while keeping aeration and/or mixing turned off (although it is in practice not uncommon that aeration and/or mixing is turned on during feeding). Aeration and/or mixing is then turned on to keep the bio-carrier 1 elements freely flowing in suspension and the active biofilm 2 growing on the bio-carrier 1 elements are degrading different contaminants in the wastewater utilizing either aerobic, anaerobic or anoxic conditions. When the concentration of a certain contaminant is low enough, aeration and/or mixing is turned off with the liquid outlet 12 still closed and because of the characteristics of the bio-carrier 1 elements they quickly settle to the bottom of the bioreactor 10. That allows for the final phase of discharging the purified liquid at a level above the settled bio-carrier 1 element level, thereby retaining the bio-carrier 1 elements in the bioreactor 10. The purified liquid may be extracted by means of pumping, gravity flow, decanting and other established technologies for sequential extraction of the liquid. The fill phase can then be repeated again (sequential feeding) or alternatively be continuous (continuous feeding) followed by the repetition of the reacting, settling and discharge phases in sequential fashion.

In one embodiment, the purified liquid is intermittently withdrawn from the bioreactor 10 wherein the bio-carrier 1 is retained in the bioreactor 10 when purifed liquid is withdrawn by sequentially inactivating the aeration and/or the stirring, thereby allowing the bio-carrier 1 to settle in the bioreactor 10 volume, and withdrawing purified liquid being present above the settled bio-carrier 1.

This referred to as sequential phase separation mode, sequential mode or sequential operation.

In one embodiment, the aeration is intermittent aeration; and/or the mixing is intermittent.

Figure 7:
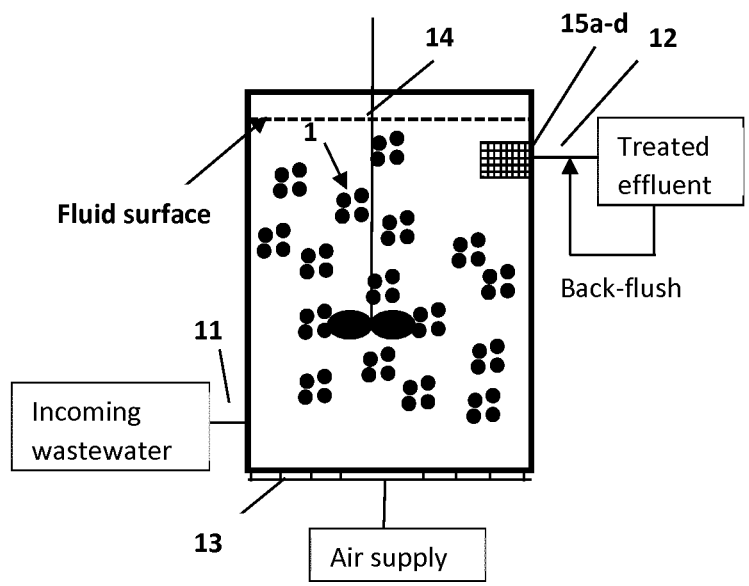
FIG. 7 is a schematic perspective view of a MBBR process run in continuous separation mode with continuous feeding and aeration utilizing sieves (15a) screens (15b), filters (15c) or membranes (15d) where the bio-carrier (1) elements are separated from the purified liquid and are thereby retained inside the bioreactor (10)

In FIG. 7, an MBBR process run in continuous separation mode with continuous feeding and aeration utilizing sieves 15a, screens 15b, filters 15c or membranes 15d can be seen. In such a process, the MBBR reactor is continuously aerated and fed, and the bio-carrier 1 elements are retained in the bio-reactor 10 utilizing said sieves 15a, screens 15b, filters 15c or membranes 15d. The bio-carrier elements 1 are separated from the purified liquid and are thereby retained inside the bioreactor 19 to retain the colonized bio-carrier 1 elements inside the bioreactor 10. The sieve 15a mesh size naturally has to be smaller than the bio-carrier 1 elements with microbial growth meaning millimeter mesh sizes. Such small mesh sizes can easily get clogged by free living or flocculated biomass building up in the bioreactor 10 in suspension and therefore back-flushing or other types of sieve 15a cleaning is recommended.

Figure 8:
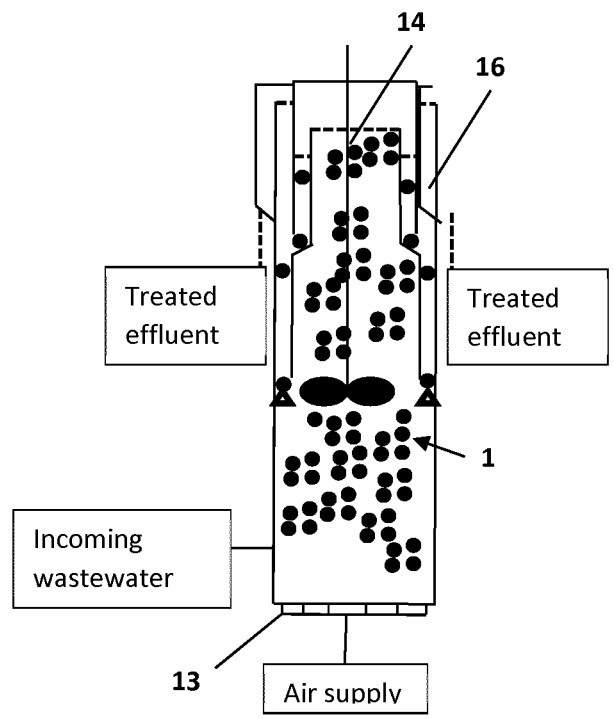
FIG. 8 is a schematic perspective view of an MBBR process run in continuous feeding mode with continuous aeration utilizing a phase separator (16) at the bioreactor outlet (12) where bio-carrier (1) elements are separated from the purified liquid and suspended free flowing solid sludge by gravity and are thereby retained inside the bioreactor (10)

Other separators may also be utilized such as shown in FIG. 8, where a phase separator 16 is used. A phase separator 16 is a device capable of separating the gaseous, liquid, suspended sludge and bio-carrier 1 element phases utilizing the differences in density between the phases and thereby retaining the bio-carrier 1 elements in the bioreactor 10, bio-carrier 1 element being in the the heaviest phase. An example of a phase separator 16 is described in Heijnen U.S. Pat. No. 5,230,794, where the carrier elements having microbial growth are separated from the purified liquid thereby retaining the carrier elements in the bioreactor 10 volume.

FIG. 8 shows an MBBR process run in continuous feeding mode with continuous aeration utilizing a phase separator 16. The bio-carrier 1 elements are separated from the pufieid liquid and suspended free flowing solid sludge by gravity and are thereby retained inside the bioreactor 10.

In one embodiment, the MBBR-system further comprises a screen 15a, sieve 15b, filter 15c, membrane 15d, or phase separator 16 to retain the bio-carrier 1 in the bioreactor 10.

In one embodiment, the purified liquid is continuously withdrawn from the bioreactor 10, the MBBR-system further comprising a screen 15a, sieve 15b, filter 15c, membrane 15d or phase separator 16 to retain the bio-carrier 1 in the bioreactor 10.

This referred to as continuous phase separation mode, continuous mode or continuous operation.

It was found that if using a screen 15a, sieve 15b, filter 15c, or membrane 15d to retain the bio-carrier 1 in the bioreactor 10, suspended sludge might build up to a greater extent in the reactor, potentially leading to the clogging of filters. As such, it seems sequential phase separation operation mode is preferable or the utilization of a phase separator 16 in continuous phase separation mode if such a problem occurs.

Sequential operation results in periods where the particles are not kept in suspension, but are accumulated on the bottom of the bioreactor 10. However, it was found that the colonized bio-carrier 1 particles do not stick or clog together any more than traditional MBBR carriers, and could easily be re-suspended into the solution.

Since bio-carrier 1 elements may eventually degrade, break up or be lost, there may be need to re-fill particles from time to time. Depending on mode of operation, particle composition, the time for degradation of particles may vary, and also different strategies for re-filling may be utilized. For instance, a small amount of bio-carrier 1 particles can be added very frequently, such as daily, or a larger amount of particles may be added less frequently, such as daily, weekly, monthly, annually or even less frequently. For a process where bio-carriers are lost at a higher rate, it may be beneficial to re-fill particles more intermittently.

In one embodiment, further bio-carriers 1 are re-filled to a bioreactor 10 periodically, such as such as daily, weekly, monthly, or even annually, to replenish lost or spent particles.

However, the fact that bio-carrier 1 particles will eventually disintegrate or degrade does not pose a problem, since this a gradual process where spent bio-carriers 1 simply will become part of the waste suspended sludge and be recycled or treated in the waste water treatment plant downsteam.

Thus in one embodiment, spent bio-carriers 1 become part of the waste suspended sludge and are recycled in the water cleaning process or downstream in the wastewater treatment plant.

In case larger particles would manage to escape the bioreactor 1, a sieve or filter may be used to capture such lost particles further downstream in the liquid flow. Such captured particles may if so be returned to the bioreactor 10 and re-used.

Screens 15a, sieves 15b, filters 15c, or membranes 15d may also be installed at the bioreactor outlet 12 to retain the colonized bio-carrier 1 elements inside the bioreactor 10, as can be seen in FIG. 7. The sieve 15a mesh size naturally has to be smaller than the bio-carrier 1 elements with microbial growth meaning millimeter mesh sizes. Such small mesh sizes can easily get clogged by free living or flocculated biomass building up in the bioreactor 10 in suspension and therefore it is preferable to back-flush or utilize other types of sieve 15b cleaning regularly.

To assure the performance of the bio-carrier 1 elements as active biofilm 2 carriers in a MBBR process for treating wastewater by removing COD and ammonia, bench scale tests were carried out in several configurations. In Example 8, two types of bio-carrier 1 elements, an industrial activated sludge based and a digested municipal sludge based, were utilized in MBBR processes. Additionally recycled polyvinylchloride particles (sink in water) were used in an MBBR process to function as a plastic material reference to the sludge based bio-carriers 1. As seen in examples 9 and 10, rapid COD removal ensued very quickly, in example 9 to 90% in 7 days, and in example 10 50% COD removal already after 3 days and thereafter reached above 90% COD removal within a week. This can be compared with the polyvinylchloride particles of example 11, which reached only 45% COD removal after 7 days and did not remove COD further after 22 days. These results clearly showed plastic materials are not suitable for use as carrier elements in MBBR processes without having a protected surface area. Also Example 16 shows the comparison of bio-carrier elements to traditional MBBR carriers with protected surface area. FIG. 22 clearly shows the more rapid COD removal utilizing the bio-carriers 1. As such, it is clear that the bio-carrier 1 particles become active very fast compared to plastic particles and traditional plastic MBBR carriers with protected surface area.

Figure 14:
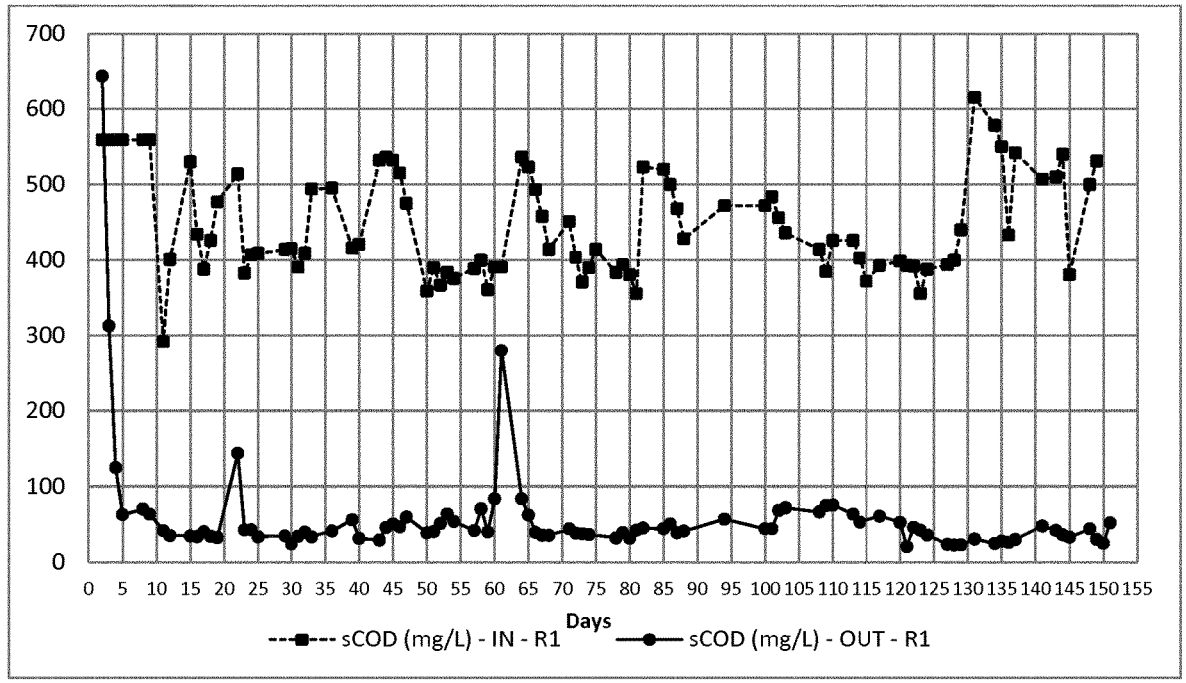
FIG. 14 is a diagram showing the soluble COD concentration in an industrial wastewater and in the purified liquid as a function of days in a MBBR process utilizing bio-carrier elements produced using an industrial activated sludge as a base raw material and operated with continuous flow and aeration with a phase separator at the outlet of the bioreactor to retain the bio-carrier elements in the bioreactor.
Figure 17:
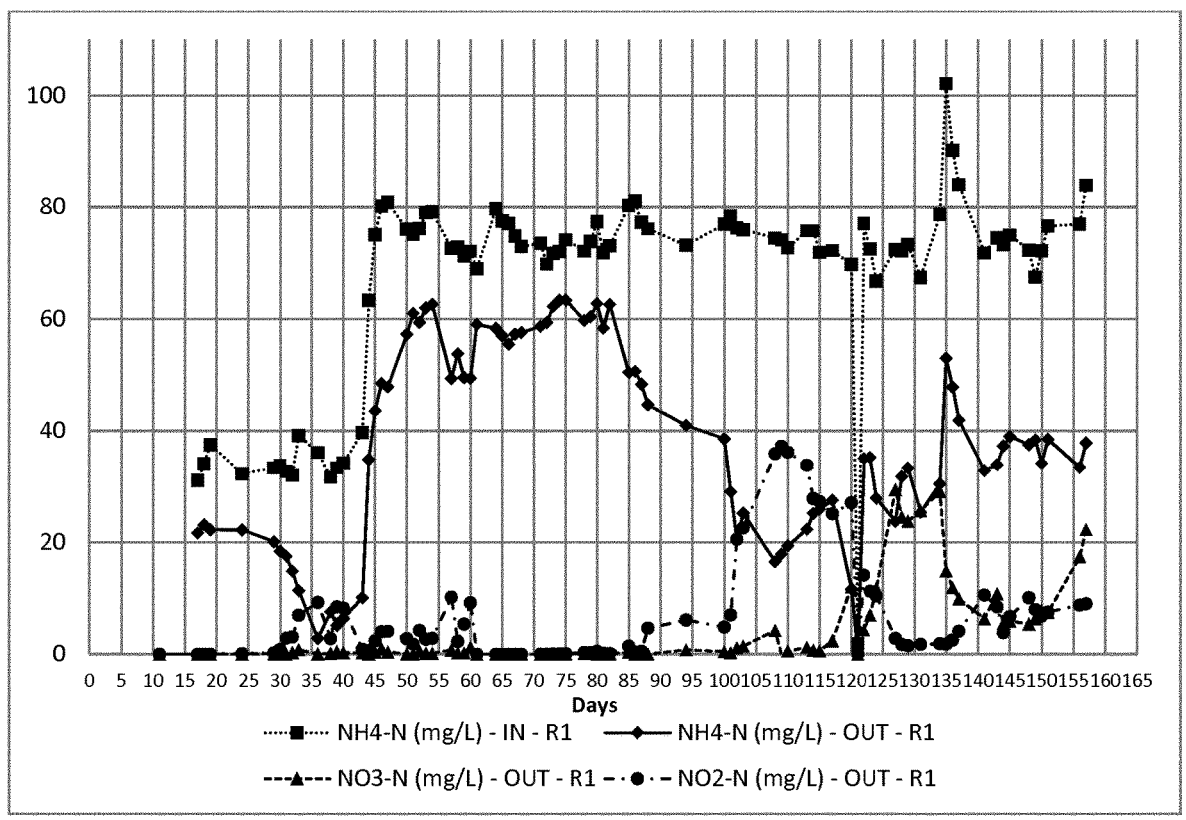
FIG. 17 is a diagram showing the ammonia ($NH_4^+$) concentration in an industrial wastewater and the ammonia, nitrate ($NO^-_3$) and nitrite ($NO^-_2$) concentration of the purified liquid as a function of days in a MBBR process utilizing bio-carrier elements produced using an industrial activated sludge as a base raw material and operated as a continuous bioreactor with a phase separator at the outlet of the bioreactor to retain the bio-carrier elements in the bioreactor.

In example 12, it is also shown that COD removal and ammonia removal can be simultaneously facilitated in a single reactor using the bio-carrier 1, as can be seen in FIGS. 14 and 17.

Example 13 shows the COD removal and ammonia removal in a 2-stage reactor using the bio-carrier 1. With the 2-stage system 95% soluble COD removal and 98% ammonia removal was achieved.

Example 14 confirms that similar results are achieved using bio-carrier 1 elements based on municipal digested sludge.

Figure 21:
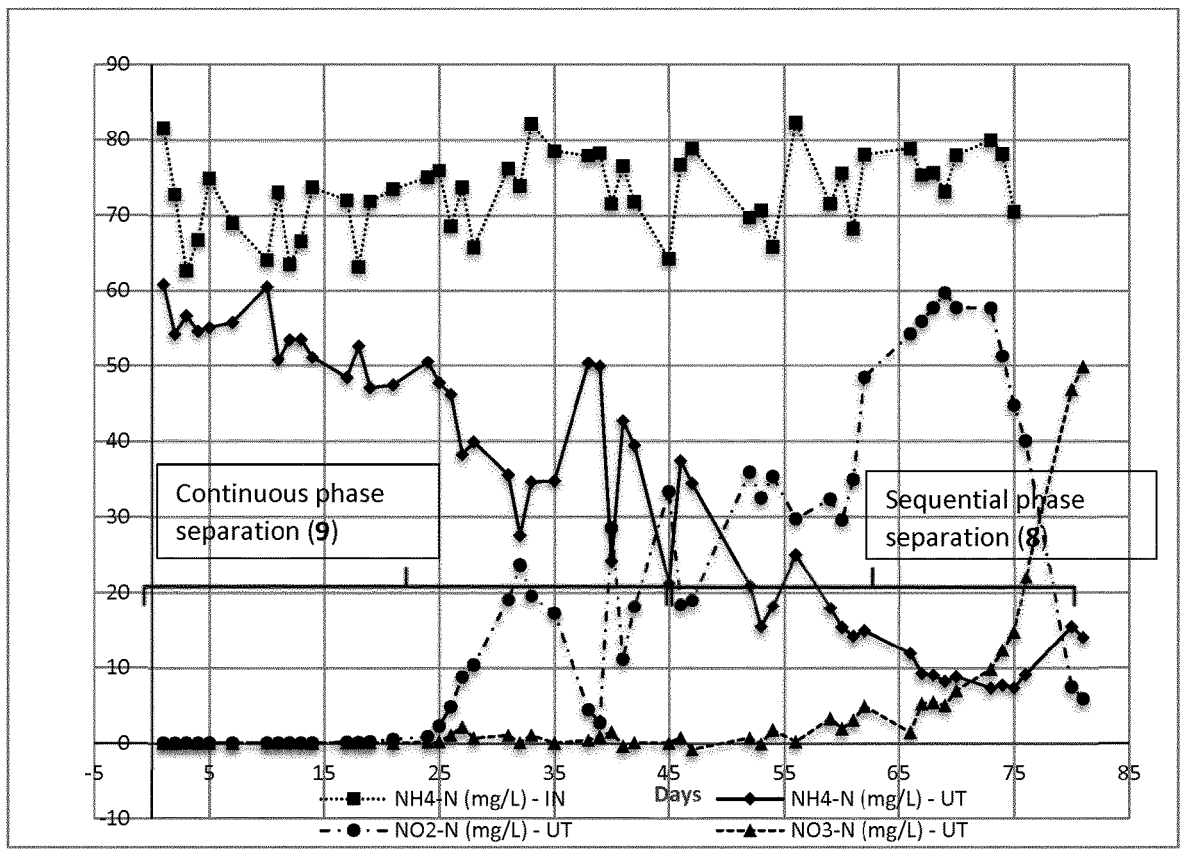
FIG. 21 is a diagram showing the showing the ammonia ($NH_4^+$) concentration in an industrial wastewater and the ammonia, nitrate ($NO^-_3$) and nitrite ($NO^-_2$) concentration of purified liquid as a function of days in a MBBR process utilizing bio-carrier elements produced using an industrial activated sludge as a base raw material where the bioreactor during the first 47 days was operated in continuous phase separation mode with continuous feed and constant aeration utilizing a sieve at the effluent outlet to retain the bio-carrier elements in the bioreactor. In the days following day 47 the operation mode was shifted from continuous phase separation mode to sequential phase separation mode, still using continuous feed but with intermittent aeration allowing the bio-carrier elements to settle and emptying the purified liquid from the top of reactor above the bio-carrier element particle level to retain them in the bioreactor.

In example 15, the bio-carrier 1 is used in an MBBR process during both sequential and continuous operational modes. Here it is shown that COD and ammonia removal in the same reactor can be achieved when running the MBBR process in continuous and sequential modes. As seen in FIG. 21, the operation of the bioreactor 10 in sequential phase separation mode instead of utilizing constant aeration was a more stable process for nitrification when simultaneously removing COD in a 1-stage reactor. The sequential phase separation ensured removing biomass in suspension while retaining the bio-carrier 1 elements. Continuous phase separation utilizing a sieve to retain the bio-carrier 1 elements in the bioreactor 10 tend to retain significantly more of the suspended biomass hampering the nitrification capacity of the biofilm 2 on the bio-carrier 1 elements. In the sequential phase separation mode, soluble COD was removed by more than 90% while simultaneously removing ammonia effectively.

Figure 9:
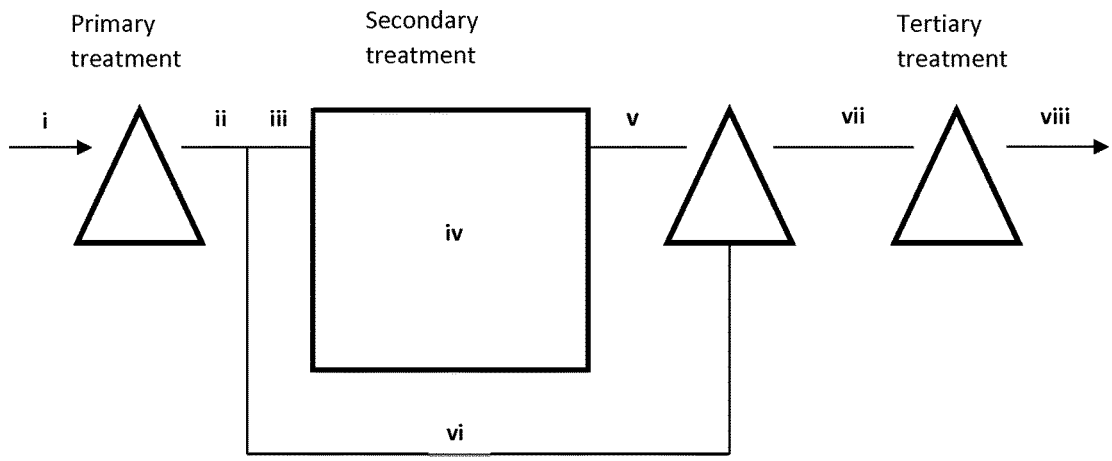
FIG. 9 is a schematic perspective view of a wastewater treatment process train into which MBBR processes utilizing the bio-carrier (1) elements may be incorporated. The denotations i to viii shows where MBBR processes utilizing the bio-carrier (1) elements may be incorporated to enhance and improve the performance of the process train.

In FIG. 9, it is also envisioned that bio-carriers 1 of the invention could be incorporated in different positions in a water treatment process train to enhance and improve the performance of the process train. It is also envisioned that bio-carriers 1 of the invention can be utilized in other treatments steps, for instance steps that are anaerobic, where the particles would enable a larger surface area for biofilm 2 growth.

Figure 10:
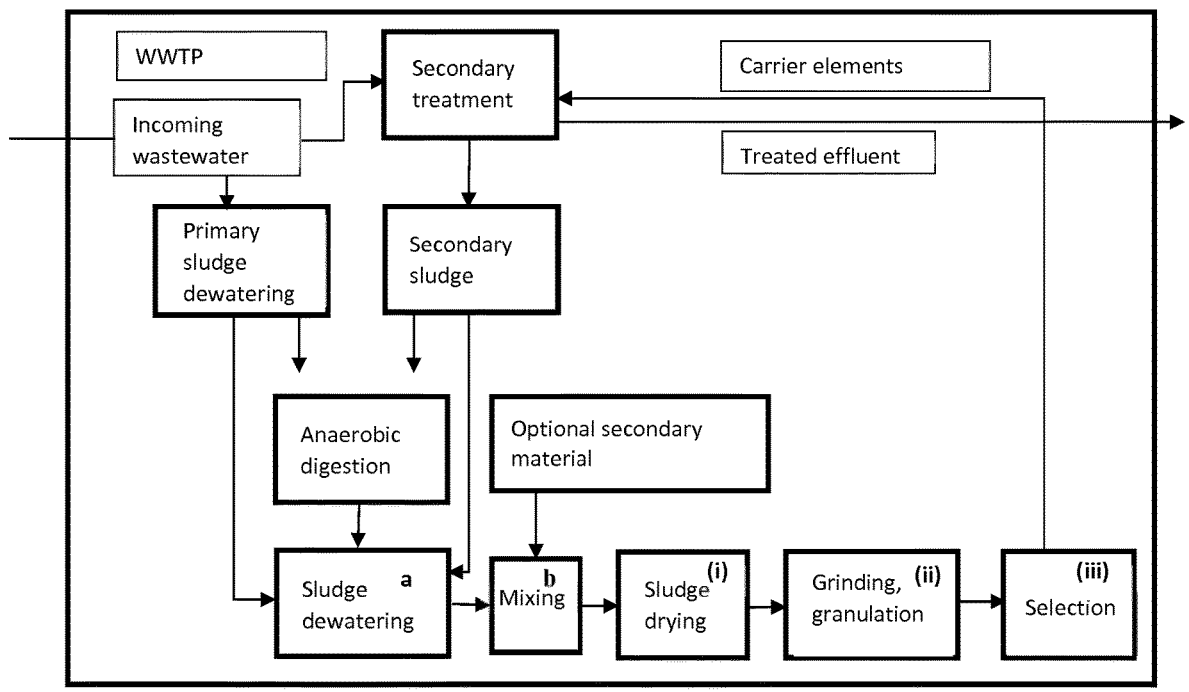
FIG. 10 is a schematic perspective view of a few possible routes for production of bio-carrier (1) elements at a wastewater treatment plant facility where initial sludge dehydration (a), optional mixing with other materials such as natural fibers and/or minerals, sludge dehydration (i), forming of dehydrated sludge to particles (ii) and selection of particles with a certain settling velocity from selection criteria (ii) can take place.
Figure 11:
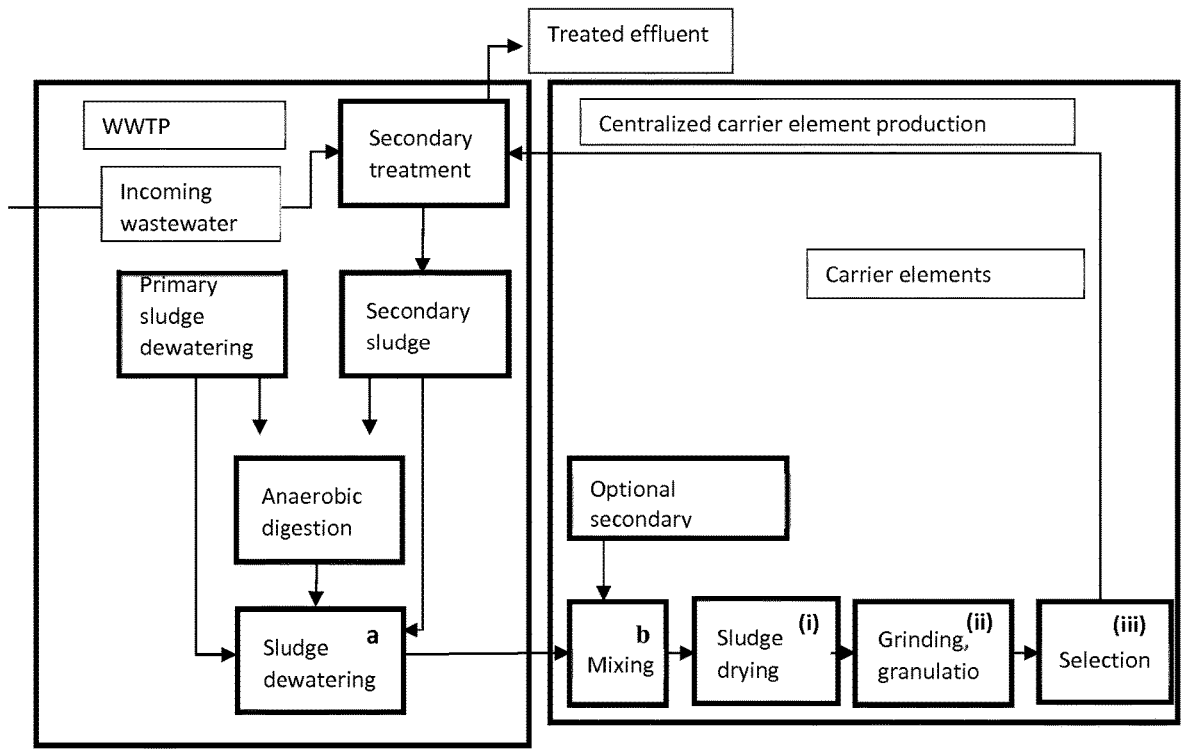
FIG. 11 is a schematic perspective view of a few possible routes for production of bio-carrier (1) elements at a wastewater treatment plant facility where the dewatered sludge base raw material is produced (a) which is then shipped to a centralized production facility where optional mixing with other materials such as natural fibers and/or minerals, sludge dehydration (i), forming of dehydrated sludge to particles (ii) and selection of particles with a certain settling velocity (iii) can take place.

In FIGS. 10 and 11, schematic perspective views of possible routes for production of bio-carrier 1 elements are shown. FIG. 10 illustrates a production process for a bio-carrier 1 element where possible types of sludge coming from any type of wastewater treatment plant that could be for example primary or secondary sludge. Both primary and secondary sludge could be directly utilized as raw material for bio-carrier 1 element production or could be for example further digested for biogas production from which digested primary sludge, digested secondary sludge or any combination thereof could be utilized as raw material for bio-carrier element production.

By using local sludge for bio-carrier 1 production, costly transports of bio-carriers 1 to the water treatment plant may be avoided. Furthermore, the bio-carriers 1 will most likely be a very good match with the sludge in the water purification process, since the sludge is collected from the specific water treatment process, which should ensure good growth properties. Also, since the bio-carriers 1 do not have to be stored or transported, the sludge may be dried to a lesser extent, which may save time and conserve energy. As such, both several environmental and economic benefits are provided.

In FIG. 11, a schematic perspective view for production of bio-carrier 1 elements where the dewatered sludge base raw material is produced at a wastewater treatment plant facility, possibly dewatered, and then shipped to a centralized production facility where the bio-particles 1 will be manufactured.

A central manufacturing facility will also provide advantages, such as avoiding the need for bio-carrier 1 manufacturing equipment at the water treatment plant. Furthermore, the central facility may have several different kinds of sludge or optional additives which may be useful in the bio-carrier 1 manufacturing process.

In the manufacturing process, the different types of sludge raw materials (which type is dependent on the configuration of the wastewater treatment plants and what technologies it utilizes on-site) are optionally further dewatered in one or several steps using one or several different technologies such as for example, but not limited to; settling techniques, centrifugation techniques, hydrocyclone techniques, dissolved air flotation techniques or filter pressing techniques in step a to reach a total solids content between 5-60 wt.-% or more likely 10-40 wt.-% or even more likely 10-30 wt.-% in the dewatered sludge.

The sludge is dehydrated in step (i) to reach a total dry solids content of >65 wt.-%, or more preferable above 80 wt.-% or even more preferable above 90 wt.-% utilizing for example, but not limited to, one or more sludge dehydration technologies such as; but limited to; thin layer drying, belt drying, drum drying, disc drying, vertical drying, solar drying or any combination thereof.

The dehydrated sludge is then formed into particles in a step (ii) by for example, but not limited to, grinding, milling, crushing, cutting, pelletization or granulation.

In one embodiment, a method of manufacture of a bio-carrier 1 comprises the steps of: (i) dehydrating sludge to a total dry solids content of more than 65 wt.-%, preferable more than 80 wt.-%, or more preferable more than 90 wt.-%; and (ii) forming the dehydrated sludge into particles.

The sludge is dehydrated using technologies including, but not limited to, sludge drying technologies by utilizing known state of the art sludge drying technology that may or may not be frequently available at a wastewater treatment plant such as for example thin layer drying, belt drying, drum drying, vacuum drying, disc drying, vertical tray drying, solar drying or any combinations thereof. Dehydration is performed in order for the bio-carrier 1 element to get high enough mechanical strength and volumetric mass density to be utilized as carrier element in MBBR processes.

In one embodiment, the dehydration in step (i) utilizes one or more sludge dehydration technologies selected from the group consisting of: thin layer drying, belt drying, rotary drum drying, disc drying, vertical drying, solar drying, vacuum drying, fluidized bed drier, and any combination thereof.

The dehydrated sludge is formed into particles using conventional state of the art technology, including but not limited to grinding, milling, crushing, cutting granulation, extrusion, pressing or pelletization or any combination thereof. The production of small particles results in a large surface area for bacteria to grow in a certain bulk volume of bio-carrier 1 elements. It also makes sure of being able to produce the optimal the settling velocity range of the produced bio-carrier 1 elements.

In one embodiment, the particles are formed in step (ii) by milling, grinding, cutting, crushing, pelletization, granulation, extrusion or pressing.

In one embodiment, step (i) and (ii) takes place simultaneously, using a technique both drying and mechanically forming the dehydrated sludge into particle form, such as rotary drum drying.

The formed particles are then selected in step (iii) to create bio-carrier 1 elements having a settling velocity suitable for operation of the bioreactor 10 in operation modes by utilizing technology including; but not limited to; sieving, screening, air classification, specific gravity separation or any combination thereof.

In one embodiment, the method of manufacture further comprises the step of:

(iii) characterizing the particles from step (ii) and, based on the characterization, selecting bio-carriers 1 for use in carrying a biofilm 2 in MBBR process.

In one embodiment, said selected bio-carriers 1 have at least one of the following attributes:

a nominal diameter of 0.5 to 10 mm, preferably 0.7 to 7 mm, and even more preferably 0,9 to 4 mm;

a volumetric mass density of 1.01 to 2.5 g/cm$^3$, preferably 1.02 to 1.8 g/cm$^3$, as determined by weighing the particle in air and then in ethanol (99.9 vol-%) at 20° C. and 1 atm;

a weight of 0.1 to 100 mg, preferably 0.5 to 30 mg.

In one further embodiment, said selected bio-carriers 1 have at least one of the following attributes:

a settling velocity in the range of 0.02 m/s to 0.4 m/s, preferably 0.05 m/s to 0.2 m/s in denatured ethanol (99.9 vol.-% ethanol) at 20° C. and 1 atm;

an inorganic content between 0 and 90 weight-%, preferably between 0.5 and 60 weight-%, as measured as ash content by the percentage of dry mass basis of the particle; and a water content between 0 and 50 weight-%, more preferably between 2 and 40 weight-% or even more preferably between 5 and 30 weight-%, as calculated by the total mass of the particle.

To enable use of efficient manufacturing sorting methods, the dehydrated sludge particles may be selected in a separated characterization step for attributes such as settling velocity, inorganic content and/or water content. Sludge particles falling within selected criteria may then be characterized in view of attributes such as size and/or weight. This enables selecting particles with suitable settling velocity, inorganic content and/or water content to be sorted through a size or weight criteria.

In one embodiment, bio-carriers 1 having a settling velocity in the range of 0.02 m/s to 0.4 m/s, preferably 0.05 m/s to 0.2 m/s in denatured ethanol (99.9 vol.-% ethanol) at 20° C. and 1 atm, are used as reference for size and/or weight parameters for sorting, thus enabling particles with suitable settling velocity to be sorted through a size or weight criteria.

If sorting by criteria such as nominal diameter or size, volumetric mass density or weight, very effective industrial sorting techniques may be utilized, such as sieving, screening, air classification, and specific gravity separation, or any combination thereof.

In one embodiment, the particles are characterized in step (iii) by a technology selected from the group consisting of sieving, screening, air classification, and specific gravity separation, or any combination thereof.

After the selection step, the bio-carrier 1 elements can be returned to the secondary biological treatment step in the wastewater treatment plant to function as biofilm 2 carrier in the biological treatment process.

The bio-carrier 1 element may also be shipped from a centralized facility for use at a local location, to function as biofilm 2 carrier in a biological treatment process.

The characterization and selection presents an opportunity to select particles that are especially suitable for the nature of the application. For instance, in example 12, COD removal is combined with ammonia removal in the same bioreactor 10, which results in significant biofilm 2 attachment because of the high COD load in the influent. In such a case, it may be advantageous to use larger, heavier bio-carrier 1 elements since a large amount of attached biofilm will lower the settling velocity of the colonized bio-carrier 1. In example 13 COD removal has already been performed in a first bioreactor 10 meaning only ammonia removal will be performed in the second reactor in series. Here lighter and smaller bio-carrier 1 elements may be used since the amount of attached biofilm 2 will be significantly lower (mainly nitrifying biofilm 2) thereby not lowering the settling velocity of the bio-carrier 1 elements to the same extent.

Different sludge will give the bio-carrier 1 slightly different properties, for instance a sludge with high inorganic content will probably produce smaller particles with suitable MBBR properties due to their higher density. As such, it may be that a suitable sludge is selected for a specific application. The selection process may also be made directly in an aerated and/or mixed vessel, such as a bio-reactor 10 or an aerated and/or mixed vessel similar to a bio-reactor. That is, if a broad range of particles (some unsuitable for MBBR) were to be added, the particles being too light/small particles would be washed away, while too heavy/large particles would sink. The particles would start to be wetted, and as such they would soon soften and become unsuitable for transportation from a central facility. If this instead takes place at a local facility, perhaps even in the MBBR bio-reactor 10, a too small particles may risk clogging filters or add a peak load on the purification process when particles are added. Similarly, excess sludge accumulated in the bottom of the bio-reactor 10 may reduce available oxygen content in the water to be purified, which may also slow down growth. As such, it is preferred to have the characterization and selection process prior to wetting of the particles.

In one embodiment, the selection step (iii) takes place in an continuously or intermittently aerated and/or continuously or intermittently mixed bioreactor 10, where particles with a settling speed lower than the characterizing criteria are discarded, when liquid is intermittently withdrawn from the bioreactor 10 wherein the bio-carrier 1 fitting the characterizing criteria is retained in the bioreactor 10 when purified liquid is withdrawn by sequentially inactivating the aeration and/or the stirring, thereby allowing the bio-carrier 1 fitting the characterizing criteria to settle in the bioreactor 10, and withdrawing liquid together with particles being too small or light to settle being present above the settled bio-carrier 1, or when liquid is continuously withdrawn from the bioreactor 10, the bioreactor 10 further comprising a screen 15a, sieve 15b, filter 15c, membrane 15d or phase separator 16 to retain the bio-carrier 1 fitting the characterizing criteria to settle in the bioreactor, and withdrawing liquid together with particles being too small or light to settle being present above the settled bio-carrier 1.

The sludge may be dewatered before the dehydration step. This is preferable if for instance if the sludge is to be transported to a central manufacturing facility, to avoid excess volume and weight of the sludge, resulting in higher costs and environmental impact. Normally, sludge is dewatered up to a total solids content of about 15-30%, but a broader range, such as 10-40% or even 5-50% will work with the bio-carrier manufacturing method.

In one embodiment, the sludge is dewatered in a dewatering step (a), before the dehydration step (i), to reach a total solids content between 5-50 wt.-%, preferably 10-40 wt.-%, or more preferably 15-30 wt.-%.

There are several different dewatering techniques which can be utilized, and different technique presents different advantages. For instance, if space and water throughput allows, settling techniques may be optimum. However, if the footprint of the dehydration step must be small and throughout high, techniques such as centrifugation or filter pressing may be preferred.

In one embodiment, the dewatering in step (a) utilizes using one or several different technologies selected from the group consisting of settling techniques, centrifugation techniques, hydrocyclone techniques, dissolved air flotation techniques, and filter pressing techniques.

As shown, most sludge types are compatible with the bio-carriers 1 of the invention. However, certain sludge-types, such as noxious chemical sludge that cannot support bio-growth or sludge sediment being primarily sand may be less suitable for manufacture of bio-carriers 1. In such cases, mixing of different sludge types, may make the sludge suitable, or one or several additives may be added and mixed into the sludge. Certain sludge types, such as highly poisonous sludge, may simply be avoided.

Additives such as organic or inorganic components can be used to change the volumetric mass density of the dehydrated sludge. A fibrous component may be used to increase the mechanical strength of the bio-carrier 1. Nutrients or minerals may be added to promote biomass growth. The additives may be added to the bio-carrier raw material according to the present invention and may constitute not more than 50% of the bio-carrier 1 element mass, preferably not more than 30% or even more preferably not more than 20%. Higher amounts than 50% would not be beneficial from a technical and/or economical point of view.

Mixing of sludge types and addition of additives preferably takes place before the sludge is dehydrated.

In one embodiment, one or several additives are added and mixed into the sludge before the dehydration step (i), the additive(s) being an organic or inorganic component, affecting the volumetric mass density of the dehydrated sludge, a fibrous component increasing the mechanical strength of the bio-carrier 1, and/or a nutrient or mineral promoting biomass growth; and/or wherein different types of sludge are mixed in a mixing step (b), before the dehydration step (i).

Although the present invention has been described above with reference to (a) specific embodiment(s), it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

EXAMPLES

The following examples are mere examples and should by no means be interpreted to limit the scope of the invention, as the invention is limited only by the accompanying claims.

Example 1: Materials and Production Methods for Carrier Elements Utilized in the Examples A number of different types of sludge and other waste raw materials were utilized for the production of carrier elements according to below.
1. Industrial dewatered activated (secondary) sludge sourced from a local wastewater treatment plant
2. Municipal dewatered digested (primary plus secondary) sludge sourced from a local wastewater treatment plant
3. Municipal dewatered primary plus secondary sludge sourced from a wastewater treatment plant (source 1)
4. Municipal dewatered activated (secondary) sludge sourced from a wastewater treatment plant (source 2)

Figure 2:
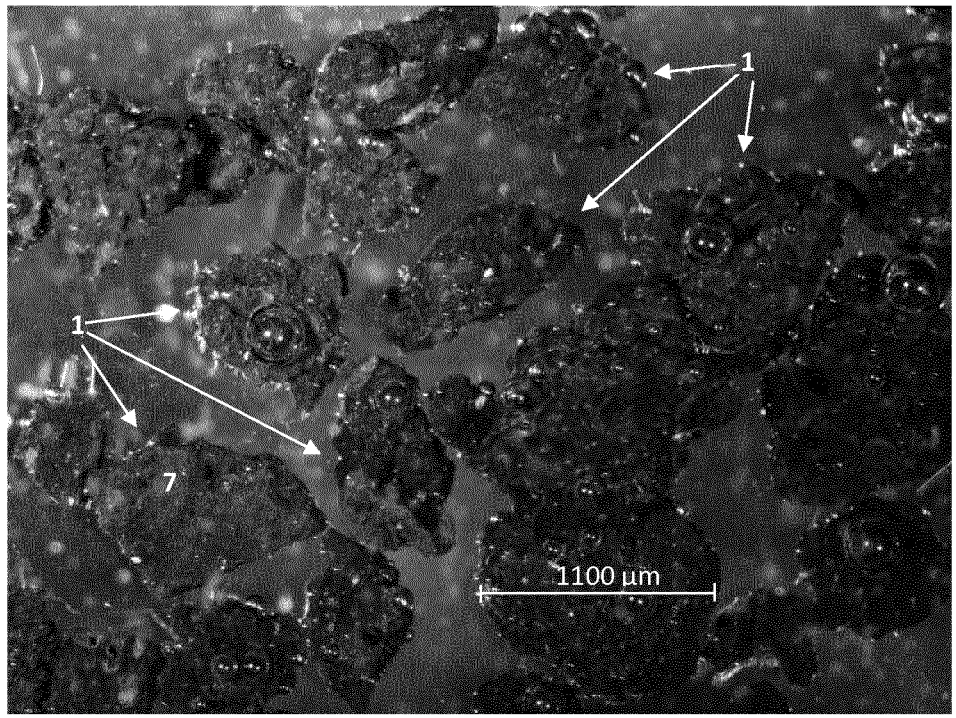
FIG. 2 is a microscopic view of bio-carrier (1) elements produced by dehydrating a digested municipal sludge having surfaces for biofilm growth before being deployed in the bioreactor.

5. Dried food waste material sourced from a producer of food
6. Recycled polyvinylchloride (PVC) particles Dewatered sludge cake from 1-4 was dried in an oven at 70° C. until reaching final total dry solids content varying between 64-95 wt.-%. The dried cakes were fed to a grinding mill to form particles and the particles were then sieved in different ratios to have a certain variation in mass and particle size between them. Sieved particles from 1 are shown in FIG. 1 and sieved particles from 2 are shown in FIG. 2.

Dewatered sludge cake from 4 was processed in a pilot scale version of a sludge dryer. In this process the sludge cake could be dried evenly in string form to different water contents varying from 64-95 wt.-% dry solids. The dried strings were fed to a grinder to form particles and the particles were then sieved in different ratios to have a certain variation in mass and particle size between them.

Additionally, and used as reference to the sludge based particles, other waste materials were tested. Ground dried food waste and recycled PVC particles as received from the supplier were fed to a grinding mill to form particles and the particles were then sieved in different ratios to have a certain variation in mass and particle size between them.

The different carrier particles produced according to above were utilized in the following examples.

Example 2: Measurement of Bio-Carrier Element Volumetric Mass Density

The volumetric mass density of bio-carrier particles was determined with the aid of ethanol (99.9 vol-%) of known density at a given temperature and atmospheric pressure ($\delta_0$). The bio-carrier particles were first weighed in air (A) and then in the liquid (B). The volumetric mass density of the solid bio-carrier particles $\delta_p$ could then be expressed according to equation 1.

$$\delta_p = \frac{A}{A-B} \cdot \delta_0 \qquad (eq.\ 1)$$

A Mettler Toledo density determination kit for AT/AG and PG/PG-S/PR balances was connected with to a Mettler Toldeo PG802-S balance with a sensitivity of 10 mg. A thermometer was suspended from the edge of a glass beaker that was on the density determination kit platform on the balance. The beaker was filled with enough denatured ethanol (99-9 vol.-%) of known density at a given temperature and atmospheric pressure to cover at least 1 cm of the solid to be measured. A holder suitable for sinking solids was suspended and it was ensured that no air bubbles adhered to the immersed part of the holder by utilizing a fine brush. The balance was then tared and 350 mg of solid bio-carrier elements were weighed in on the weighing pan attached to the Mettler Toldeo density determination kit. The displayed weight was noticed (weight of the solid in air). The solid bio-carrier elements were then removed from the weighing pan and placed in the sample holder being immersed in the ethanol. It was ensured no air bubbles adhered to the solids by removing them with a fine brush. The balance was allowed to stabilize and allowed for direct measurement of the buoyancy P which is P=A-B. The volumetric mass density of the solid bio-carrier element could then be calculated according to equation 2.

$$\delta_p = \frac{A}{P} \cdot \delta_0 \qquad (eq.\ 2)$$

The volumetric mass density of particles produced from a number of different waste raw materials determined using the method above are shown below.

| Raw material | Particle water content (wt.-%) | Volumetric mass density (kg/m³) |
|---|---|---|
| Dehydrated industrial activated sludge (FIG. 1) | 5 | 1200 |
| Dehydrated municipal digested sludge (FIG. 2) | 5 | 1530 |
| Dehydrated municipal activated sludge (source 1) | 5 | 1380 |
| Dehydrated municipal activated sludge (source 2) | 5 | 1310 |
| Dehydrated municipal activated sludge (source 2) | 26 | 1270 |
| Dehydrated food waste biomass | 5 | 1370 |
| Recycled PVC (polyvinylchloride) | 0 | 1450 |

As seen in the table above different sludge raw materials all have volumetric mass densities above the volumetric mass density of water meaning they will sink in water.

Example 3: Measurement of Bio-Carrier Element Fall Velocity

The fall velocity of the carrier particles was measured according to the falling-sphere viscometer experiment. An 80 cm tall measuring glass with a diameter of 5 cm was filled with denatured ethanol (99.9 vol.-% ethanol). The measuring glass was centimetre marked on the outside and each particle was held just below the surface of the ethanol using tweezers. The particle was released and a timer was started when the particle passed the zero centimetre mark five cm below the ethanol surface. The timer was stopped when the particle reached the seventy cm mark, five cm above the measure glass bottom. Thereby the particle settling velocity could be calculated by dividing the fall height of the particle (0.7 m) with the measured time. Ethanol is used instead of water as liquid medium due to its significantly lower surface tension compared to water decreasing the measurement error sources when dealing with such small particles as the ones utilized in the present invention.

Figure 12:
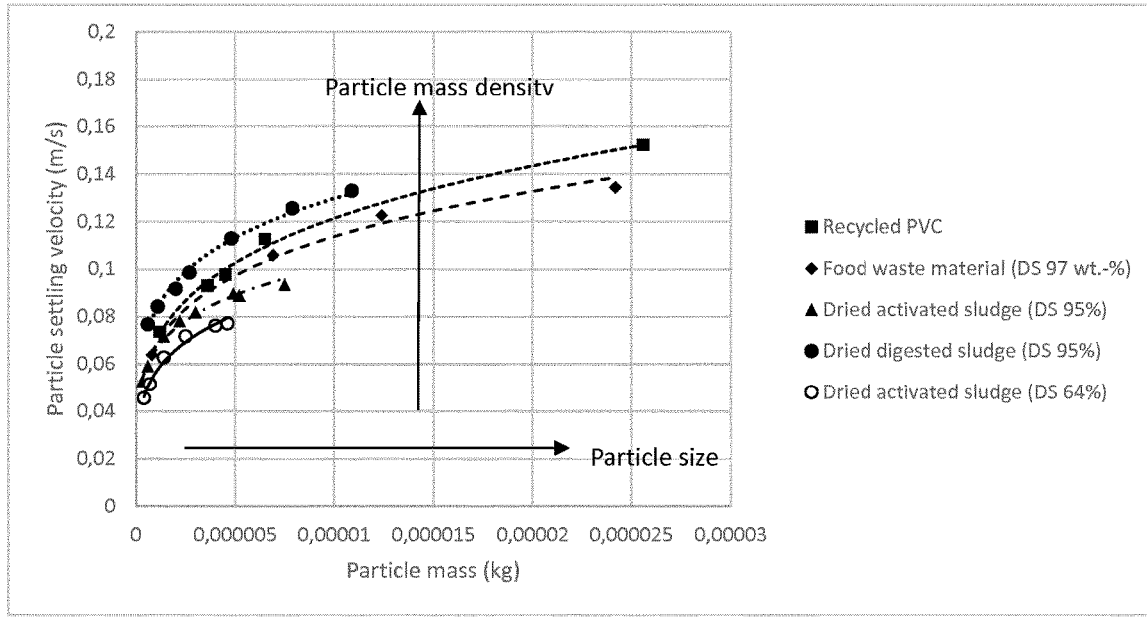
FIG. 12 is a diagram showing the fall velocity of various bio-carrier elements in ethanol (99.9 vol.-%) at 20° C. and atmospheric pressure as a function of nominal particle size where the nominal particle size has been derived from equation 4.

The fall velocity was measured for a number of different particle masses and materials summarized below where the water content was measured to be 5 wt.-% for all particles. The particle fall velocity as function of particle mass of various carrier elements are also shown in FIG. 12

| Raw material | Particle water content (wt.-%) | Particle mass (mg) | Fall velocity (m/s) |
|---|---|---|---|
| Dehydrated municipal digested sludge (FIG. 2) | 5 | 10.9 | 0.133 |
| | 5 | 7.9 | 0.125 |
| | 5 | 4.8 | 0.113 |
| | 5 | 2.7 | 0.098 |
| | 5 | 2.0 | 0.092 |
| | 5 | 1.1 | 0.084 |
| | 5 | 0.6 | 0.076 |

-continued

| Raw material | Particle water content (wt.-%) | Particle mass (mg) | Fall velocity (m/s) |
|---|---|---|---|
| Dehydrated municipal activated sludge (source 2) | 5 | 7.5 | 0.094 |
| | 5 | 5.2 | 0.088 |
| | 5 | 3.0 | 0.082 |
| | 5 | 2.2 | 0.078 |
| | 5 | 1.4 | 0.072 |
| | 5 | 0.6 | 0.059 |
| | 5 | 0.3 | 0.052 |
| | 26 | 4.6 | 0.077 |
| | 26 | 4.0 | 0.076 |
| | 26 | 2.5 | 0.071 |
| | 26 | 1.4 | 0.063 |
| | 26 | 0.7 | 0.051 |
| | 26 | 0.4 | 0.046 |
| Dehydrated food waste biomass | 5 | 24.2 | 0.134 |
| | 5 | 12.4 | 0.123 |
| | 5 | 6.9 | 0.106 |
| | 5 | 0.8 | 0.064 |
| Recycled PVC (polyvinylchloride) | 0 | 25.6 | 0.152 |
| | 0 | 6.5 | 0.113 |
| | 0 | 4.5 | 0.098 |
| | 0 | 3.6 | 0.093 |
| | 0 | 1.2 | 0.074 |

Example 4: Determination of Bio-Carrier Particle Nominal Size

The settling velocity of the bio-carrier element depends on volumetric mass density and particle size (or mass) according to Stokes' law. Stokes law expresses the frictional force or drag force ($F_d$) exerted on spherical objects with very small Reynolds numbers (laminar flow) in a viscous fluid. It is stated as below:

$$F_d = 6\pi\mu r v \quad (eq. 3)$$

where: $F_d$ is the frictional force acting on the interface between the fluid and the particle, $\mu$ is the dynamic viscosity of the viscous fluid, r is the radius of the spherical object and v is the flow velocity relative to the object.

In SI units, $F_d$ is given in Newton, $\mu$ in Pa·s, r in meters and v in m/s. Stokes' law makes the assumptions of laminar flow, spherical particles, homogeneous (uniform in composition) material, smooth surfaces and that particles do not interfere with each other.

Stokes' law is the basis of the falling-sphere viscometer. In this type of experiment the fluid is stationary in a vertical glass tube. A sphere of known size and density is allowed to fall through the liquid. The terminal velocity of the sphere can be measured by the time it takes to pass two marks on the tube. At terminal (or settling) velocity the excess force ($F_g$) is given by:

$$F_g = (\delta_p - \delta_f) g 4/3 \pi r^3 \quad (eq. 4)$$

where: $\rho_p$ and $\rho_f$ are the mass densities of the sphere and fluid, respectively and g is the gravitational acceleration.

The terminal velocity ($v_t$) is then given by balancing the two forces through $F_d = F_g$ and solving for the velocity (v). If the particle is falling in the viscous fluid under its own weight then the terminal velocity, or settling velocity, is reached when the frictional force combined with the buoyant force exactly balances the gravitational force. This velocity v (m/s) is given by:

$$v_t = \frac{2}{9} \frac{(\delta_p - \delta_f)}{\mu} g r^2 \quad (eq. 5)$$

where: $v_t$ is directed vertically downwards if $\rho_p > \rho_f$, and vertically upwards if $\rho_p < \rho_f$, g is the gravitational acceleration (m/s²), r is the radius of the spherical particle, $\rho_p$ is the mass density of the particles (kg/m³), $\rho_f$ is the mass density of the fluid (kg/m³) and $\mu$ is the dynamic viscosity of the viscous fluid (kg/m*s).

Settling or fall velocities of non-spherical particles, rough particles, or particles in very high concentrations are somewhat lower compared to smooth spherical particles in laminar flow as studied by Stokes. The rapid settling of larger particles with rougher non-spherical shapes is resisted predominantly by the turbulent drag of the wake behind each grain (particle). Ferguson and Church (Journal of Sedimentary Research, Vol. 74, No. 6, Nov., 2004, P. 933-937) have proposed an explicit equation for grain sediment fall velocity over the entire size range also including a shape factor ($C_2$), including the transitional region, and show that it agrees well with published and new experimental data. The equation states;

$$w = \frac{\left(\frac{\delta_p - \delta_f}{\delta_f}\right) \cdot g \cdot D^2}{C_1 v + \left(0.75 \cdot C_2 \cdot \left(\frac{\delta_p - \delta_f}{\delta_f}\right) \cdot g \cdot D^3\right)^{0.5}} \quad (eq. 6)$$

Where; w is the particle fall velocity (m/s), g is the gravitational acceleration that takes the value of 9.82 (m/s²), D is the particle diameter which in case of a non-spherical particle is the particle diameter of a sphere of equivalent volume as the non-spherical particle (m), $\rho_p$ is the volumetric mass density of the particles (kg/m³), $\rho_f$ is the volumetric mass density of the fluid (kg/m³), v is the kinematic viscosity of the viscous fluid (m²/s), $C_1$ is a constant that takes the value of 24 for very angular particles, $C_2$ is a constant that takes the value of 1.2 for very angular particles Since the bio-carrier element particles generally are irregularly shaped, inhomogeneous and have rough surfaces, equation 4 can be utilized to calculate their particle fall velocity in various liquids. By measuring the volumetric mass density ($\rho_p$) at atmospheric pressure and 20° C. in ethanol (Example 2) and the particle fall velocity of the bio-carrier elements in ethanol at atmospheric pressure and 20° C. (Example 3) the nominal particle diameter, defined in the present invention as the particle diameter of a sphere of the same material as the non-spherical bio-carrier particle having the same volume as the non-spherical bio-carrier particle, can be calculated. By using a kinematic viscosity of ethanol at 20° C. and atmospheric pressure of $v = 1.52 \cdot 10^{-6}$ m²/s, a volumetric mass density of ethanol at 20° C. and atmospheric pressure of $\delta_f = 793$ kg/m³ the calculated nominal diameter of various carrier elements are shown below. In FIG. 13 extrapolated values (to increase the curve span for settling velocities that were not measured in the current example) are also shown.

| Raw material | Particle water content (wt.-%) | Nominal particle diameter (mm) | Fall velocity (m/s) |
|---|---|---|---|
| Dehydrated municipal digested sludge (FIG. 2) | 5 | 2.2 | 0.133 |
|  | 5 | 2.0 | 0.125 |
|  | 5 | 1.7 | 0.113 |
|  | 5 | 1.4 | 0.098 |
|  | 5 | 1.3 | 0.092 |
|  | 5 | 1.2 | 0.084 |
|  | 5 | 1.1 | 0.076 |
| Dehydrated municipal activated sludge (source 2) | 5 | 1.8 | 0.094 |
|  | 5 | 1.7 | 0.088 |
|  | 5 | 1.5 | 0.082 |
|  | 5 | 1.4 | 0.078 |
|  | 5 | 1.3 | 0.072 |
|  | 5 | 1.0 | 0.059 |
|  | 26 | 1.5 | 0.076 |
|  | 26 | 1.4 | 0.071 |
|  | 26 | 1.2 | 0.063 |
| Dehydrated food waste biomass | 5 | 2.7 | 0.134 |
|  | 5 | 2.4 | 0.123 |
|  | 5 | 1.9 | 0.106 |
|  | 5 | 1.0 | 0.064 |
| Recycled PVC (polyvinylchloride) | 0 | 3.0 | 0.152 |
|  | 0 | 1.9 | 0.113 |
|  | 0 | 1.6 | 0.098 |
|  | 0 | 1.5 | 0.093 |
|  | 0 | 1.1 | 0.074 |

Example 5: Determination of Maximum and Minimum Particle Settling Velocity Characteristic for Use in MBBR For a bio-carrier element to function well in MBBR processes it has to have a certain maximum settling velocity in water above which it will be difficult have properly aerated particles free-flowing in suspension. To determine the maximum settling velocity characteristic ($v_{max}$) as measured according to example 3, particles having a wide range of measured settling velocities (0.1, 0.15, 0.20, 0.25 and 0.30 m/s when measured according to example 3) were accumulated in five separate bulk volumes, with particles having the same settling velocities in the same bulk volume, corresponding to 15% of the bioreactor. That is a bio-carrier element fill grade that has been tested to work efficiently in the biological process in the present invention. Water was then added to the bioreactor volumes and air was blown from the bottom of the bioreactor at a rate simulating a full scale MBBR aeration with similar capacity as the 15% load of bio-carrier elements. By measuring the fill rate in a water sample taken at the top of the aerated reactor volume it could be seen for what particle settling velocity, the fill rate in the taken sample from the top was below 5%. The settling velocity as measured in example 3 of the particles where the fill rate at the top went below 5% was set as $v_{max}$ above which the bio-carrier element was considered no longer properly free-flowing in suspension. $v_{max}$ for a bio-carrier element was determined to be 0.2 m/s when measured as according to example 3.

To determine the minimum settling velocity characteristic ($v_{in}$) as measured according to example 3, bio-carrier elements having different settling velocities were accumulated in a number of separate bulk volumes, with particles having the same settling velocities in the same bulk volume, corresponding to 15% of the bioreactor. Five parallel bioreactors were setup, each containing a bulk volume of particles with the same settling velocities (0.01, 0.03, 0.05, 0.1 and 0.12 m/s as measured according to Example 3). The reactors were run with sequential phase separation mode utilizing a settling time of 1 minute and an industrial wastewater (soluble COD load of 4 kg/m³/day) was fed to each bioreactor to induce biofilm growth on the bio-carrier elements. Significant biofilm growth was allowed to establish on the bio-carriers for 30 days. Bioreactors containing bio-carrier elements with biofilm growth and a too low virgin settling velocity characteristic had lost a significant amount of bio-carrier elements with the discharged liquid. The bioreactors containing bio-carrier elements with settling velocity characteristics of 0.01 and 0.03 m/s had lost 75 and 50% of carrier elements respectively) while the bioreactor containing carrier bio-carrier-elements with a settling velocity characteristic of 0.05 m/s had lost 10% of carrier elements. The bioreactors containing bio-carrier elements with settling a velocity characteristic of 0.1 and 0.12 m/s had lost insignificant amounts of bio-carrier elements. With the results from these experiments $v_{min}$ as measured according to Example 3, of a virgin bio-carrier element without biofilm growth was set to be 0.05 m/s.

Example 6; Determination of Inorganic and Organic Content of Bio-Particle

Wet sludge was weighed ($m_{wet\ sludge}$) and then dried in an oven at 105° C. for 24 h. The dried sample was then weighed again ($m_{dry\ sludge}$) and the percentage of water content was calculated according to $100*m_{dry\ sludge}/m_{wet\ sludge}$. Thereafter the dried sludge sample was put in an oven at 550° C. for 4 h. The "ashed" sample was then weighed again (mash). The inorganic content in the dried sludge was calculated according to 100*(mash/mdry sludge). Thereafter the organic content in the dried sludge was calculated according to 100*(1-mash/mdry sludge). Results of water content based on total particle mass, inorganic content on particle dry mass basis and organic content on particle dry mass basis for bio-carrier elements produced from various sludge sources are shown below.

| Carrier element | Water content (%) | Inorganic (ash) content 100 * (mash/mdry sludge) | Organic content 100 * (1 − mash/mdry sludge) |
|---|---|---|---|
| Dehydrated industrial activated sludge (FIG. 1) | 1.7 | 5.3 | 94.7 |
| Dehydrated municipal digested sludge (FIG. 2) | 6.6 | 38.9 | 61.1 |
| Dehydrated municipal activated sludge (source 1) | 2.2 | 23.6 | 76.4 |
| Dehydrated municipal activated sludge (source 2) | 8.0 | 25.5 | 74.5 |
| Dehydrated municipal activated sludge (source 2) | 26 | 25.6 | 74.4 |

Additionally organic or inorganic additives may be added to the bio-carrier raw material according to above in order to modify the bio-carrier element properties such as, but not limited to, structural integrity, volumetric mass density, surface bonding properties or biological activity promoting properties. Such organic or inorganic materials maybe be, but limited to, fiber materials for structural integrity enhancement, various mineral for modifying the volumetric mass density or various types of nutrients and/or catalysts for promoting enhancing surface properties and promoting biological activity even further.

The additives may be added to the bio-carrier raw material according to the present invention and may constitute not more than 50% of the bio-carrier element mass, preferably not more than 30% or even more preferably not more than 20%. Higher amounts than 50% would not be beneficial from a technical and/or economical point of view.

Example 7: Settling of Colonized and Sheared Bio-Carrier Elements

To test the settling velocity of colonized and sheared bio-carrier elements 380 mL bulk volume (150 mL bulk volume of virgin bio-carrier elements) of colonized bio-carrier elements was dispersed in 1 L fresh tap water in a beaker and the contents were rapidly poured into a 1000 mL glass measure. A timer was started and the colonized carriers were allowed to settle in the glass measure. 380 mL was the minimum bulk volume occupied by the colonized bio-carrier elements and they could not settle more than that. The table below shows the time required to settle fully colonized bio-carrier elements following an interruption in aeration. The colonized bio-carrier elements settled close to their original bulk in around 1 min.

| Sludge volume (mL) | Time (s) |
|---|---|
| 1000 | 0 |
| 800 | 7 |
| 700 | 16 |
| 600 | 22 |
| 500 | 31 |
| 400 | 60 |
| 380 | 1800 (30 min) |

Example 8: Operation of MBBR Bioreactors with Continuous Phase Separation Utilizing Bio-Carrier Elements and Recycled PVC Carrier Elements To assure the performance of the bio-carrier elements as active biofilm carriers in a MBBR process for treating wastewater by removing COD and ammonia, bench scale tests were carried out in several configurations. Two types of bio-carrier elements, an industrial activated sludge based and a digested municipal sludge based, were utilized in MBBR processes. Additionally recycled polyvinylchloride particles (sink in water) were also utilized in a MBBR process to function as a plastic material reference to the sludge based bio-carriers particles. All carrier elements utilized were selected to have a settling velocity characteristic above 0.05 m/s and below 0.2 m/s when measured as according to Example 3. Three one-liter bioreactors were set up in parallel. 150 mL bulk volume of the three different carrier elements and recycled PVC particles were added in the separate bioreactors. The bioreactors were continuously fed with an industrial wastewater containing around 500 mg/L soluble COD, 80 mg/L $NH_4^+$—N, 5 mg/L $PO_4^+$—P, buffer solution ($NaHCO_3$) and trace metals utilizing a hydraulic retention time of 2 hours, a temperature of 20° C., with continuous aeration and the carrier elements were retained in the bioreactor by utilizing continuous phase separation mode 10 according to FIG. 8.

Example 9: COD Removal in MBBR Utilizing Bio-Carrier Elements Based on Industrial Activated Sludge With MBBR bioreactor operational procedure according to example 8, FIG. 14 shows the results of influent and effluent soluble COD concentrations during 150 days of operation utilizing bio-carrier elements produced from dehydrated industrial activated sludge. Soluble COD removal, in excess of 90%, was achieved after 5 days of operation. After 22 days half of the bio-carrier elements were removed and a sharp increase in soluble COD concentration in the outlet was observed. The system recovered though and removal in excess of 90% was again achieved the following day. After 60 days an operational error of low pH shock immobilized the bacteria in the grown biofilm and a sharp increase in soluble COD concentration in the outlet was seen. The system again recovered achieving above 90% removal after 3-4 days and then remained stable at or above 90% soluble COD removal for the rest of the trial.

Figure 15:
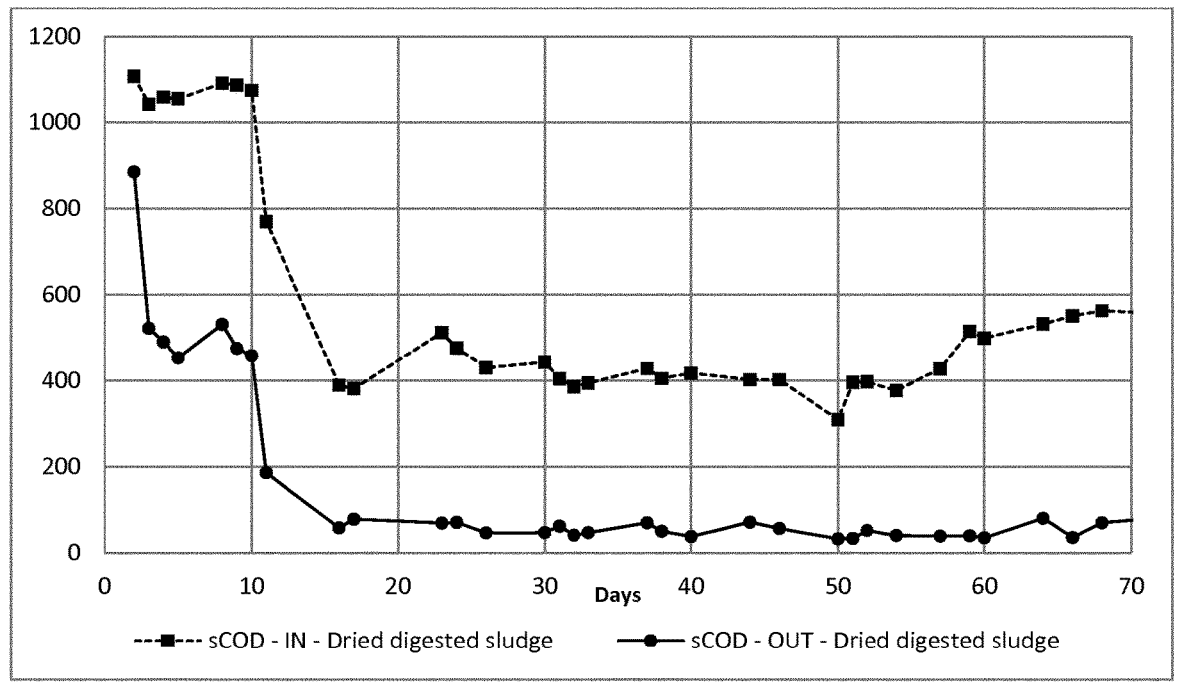
FIG. 15 is a diagram showing the soluble COD concentration in an industrial wastewater and in the purified liquid as a function of days in a MBBR process utilizing bio-carrier elements produced using a municipal digested sludge as a base raw material and operated with continuous flow and aeration with a phase separator at the outlet of the bioreactor to retain the bio-carrier elements in the bioreactor.

Example 10: COD Removal in MBBR Utilizing Bio-Carrier Elements Based on Municipal Digested Sludge With MBBR bioreactor operational procedure according to example 8, FIG. 15 shows the results of influent and effluent soluble COD concentrations during 70 days of operation of a bioreactor utilizing bio-carrier elements produced from dehydrated municipal digested sludge. The initial ten days the soluble COD concentration in the inlet was double (1000 mg/mL) compared to example 9. From FIG. 17 it is seen that the soluble COD concentration was lowered by half in three days, remaining constant at this concentration thereafter thereby removing the same amount of soluble COD as when utilizing the bio-carriers in example 8. The inlet concentration was cut in half after ten days to match the inlet concentration of the soluble COD removal reactor in Example 8. 6 days after lowering the inlet concentration a soluble COD reduction of 85% was reached and remained stable between 85-95% from thereon. This was similar to the performance of bio-carrier in Example 9.

Example 11: COD Removal in MBBR Utilizing Carrier Elements Based on Recycled Polyvinylchloride (PVC)

With MBBR bioreactor operational procedure according to example 8, FIG. 16 shows the results of influent and effluent soluble COD concentrations during 21 days of operation of a bioreactor utilizing carrier elements based on recycled PVC. Soluble COD reduction was 45% after 7 days and remained fairly constant around 50% from thereon.

Example 12: Ammonia Removal in 1-Stage MBBR Utilizing Bio-Carrier Elements Based on Industrial Activated Sludge With MBBR bioreactor operational procedure according to example 8 (except from in this example initially having an ammonia nitrogen concentration of 40 mg/L), FIG. 17 shows the results of influent (liquid to be purified) and effluent (purified liquid) ammonia nitrogen ($NH_4$—N) and effluent nitrite ($NO^-_2$—N) and nitrate ($NO^-_3$—N) concentrations during 150 days of operation of a bioreactor utilizing bio-carrier elements produced from dehydrated industrial activated sludge. Nitrification started after 30 days when $NO_2^-$—N concentration started to increase in the effluent. The $NH_4^+$—N in the effluent was almost depleted after 35 days, five days after nitrification was initiated. Therefore the $NH_4^+$—N inlet concentration was doubled to 80 mg/L after 43 days. After 55 days the $NH_4^+$—N concentration in the outlet started to decrease again with the increase of $NO_2^-$—N concentration in the effluent while simultaneously removing soluble COD as shown in Example 9. After 60 days an operational error of low pH shock immobilized the nitrifiers in the biofilm and $NO_2^-$—N and $NO_3^-$—N production was eradicated. Recovery of nitrifiers in the biofilm could then be seen after 80 days operation when $NH_4^+$—N removal increased significantly reaching 85% removal after 120 days of operation with accompanied $NO_2^-$—N concentration increase in the effluent. The soluble COD removal remained high (FIG. 14) simultaneously with the increasing $NH_4^+$—N removal.

Figure 18:
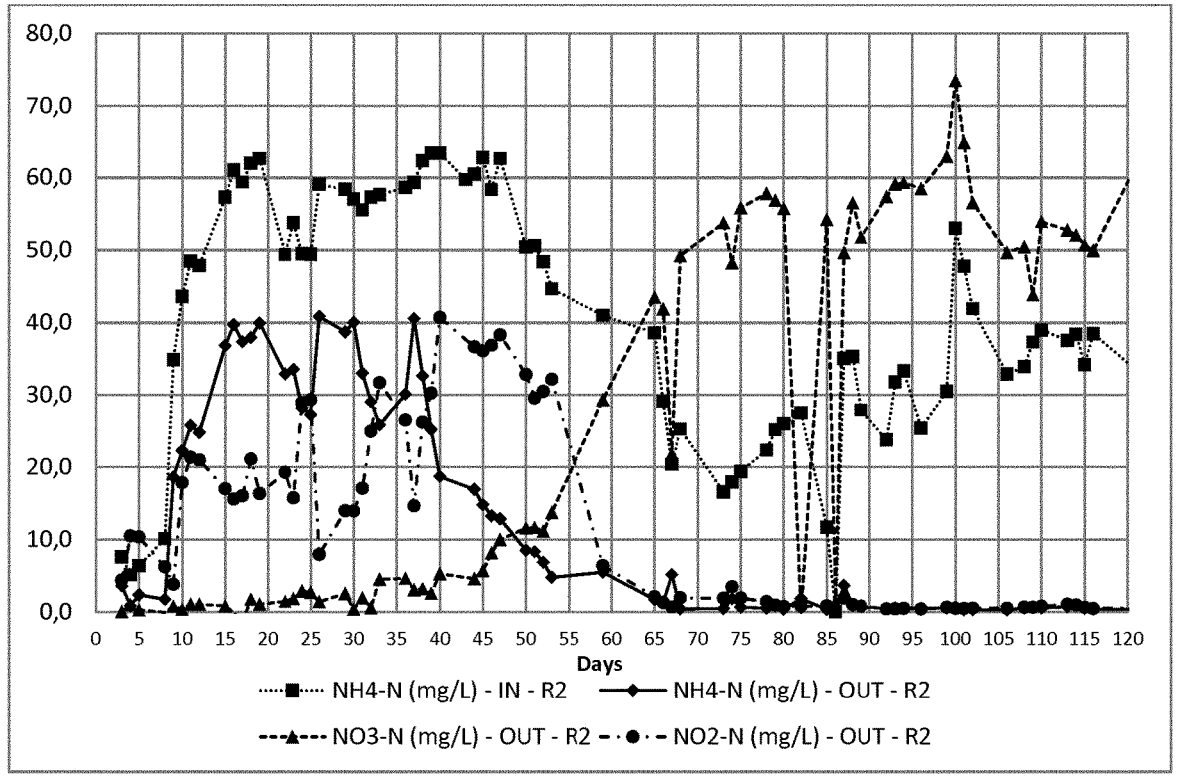
FIG. 18 is a diagram showing the ammonia ($NH_4^+$) concentration in an industrial wastewater and the ammonia, nitrate ($NO^-_3$) and nitrite ($NO^-_2$) concentration of purified liquid as a function of days in a second bioreactor volume connected in series to a first one operated with continuous flow and aeration utilizing bio-carrier elements produced using an industrial activated sludge as a base raw material. The carrier element particles were retained in the bioreactor by utilizing a phase separator at the outlet of the bioreactor to retain the bio-carrier elements in the bioreactor.

Example 13: Ammonia Removal in 2-Stage MBBR Utilizing Bio-Carrier Elements Based on Industrial Activated Sludge An additional reactor was coupled in series (2-stage MBBR, 5b) to the reactor in Example 9 and 12 to improve the ammonia reduction further. The reactor coupled in series was put into operation after running the first COD removal reactor (FIGS. 14 and 17) for 36 days and was kick-started by using some of the bio-carrier elements already having biofilm growing from the COD removal bioreactor together with virgin bio-carrier elements at a total bulk volume of 15% of the bioreactor volume. The wastewater fed to the reactor coupled in series was the effluent from the reactor coming out of COD removal reactor (FIGS. 14 and 17). FIG. 18 shows the results of influent and effluent ammonia nitrogen ($NH_4$—N) and effluent nitrite ($NO_2^-$—N) and nitrate ($NO_3^-$—N) concentrations in the second reactor coupled in series. The $NH_4$—N concentration in the effluent started to steadily decrease after 37 days (independent of the $NH_4$—N removal in the first reactor) with corresponding increases in ($NO_2^-$—N) and ($NO_3^-$—N) concentrations. After 67 days all $NH_4$—N was depleted with only $NO_3^-$—N left in the effluent indicating full nitrification which stayed stable throughout the trial ending at day 120. With the 2-stage system 95% soluble COD removal and 98% ammonia and nitrite removal was achieved.

Figure 19:
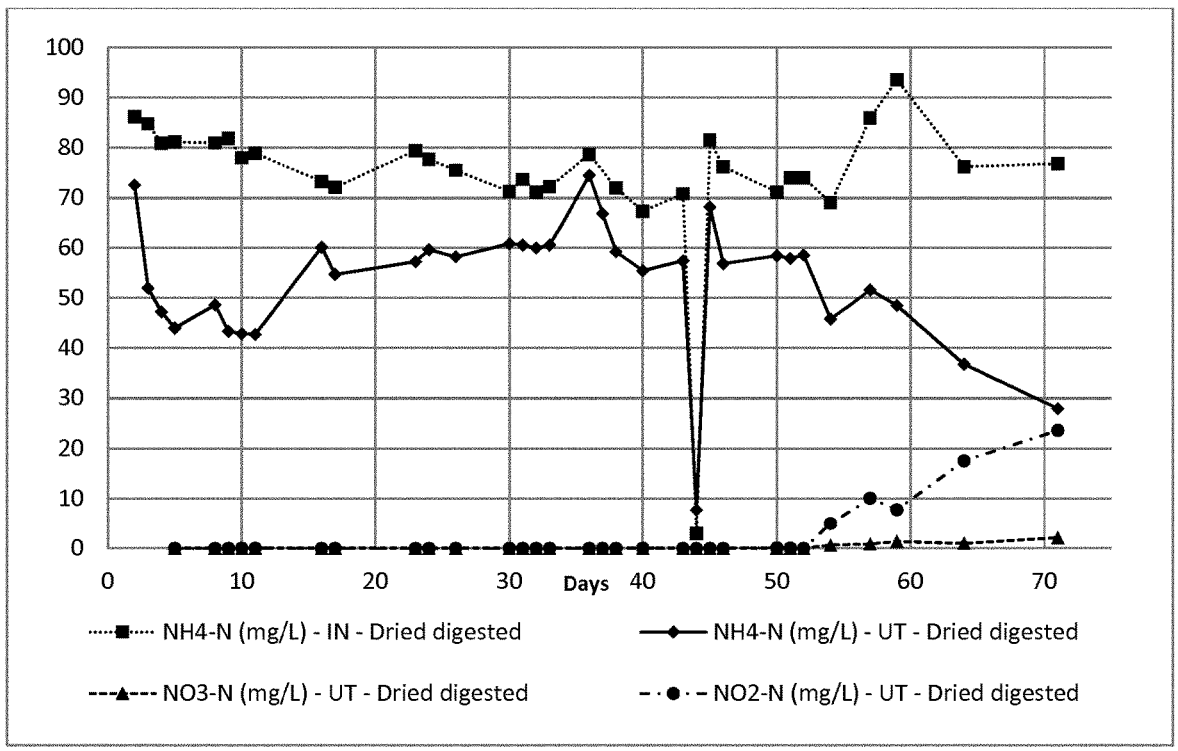
FIG. 19 is a diagram showing the ammonia ($NH_4^+$) concentration in an industrial wastewater and the ammonia, nitrate ($NO^-_3$) and nitrite ($NO^-_2$) concentration of purified liquid as a function of days in a MBBR process utilizing bio-carrier (1) elements produced using an municipal digested sludge as a base raw material and operated with continuous flow and aeration with a phase separator at the outlet of the bioreactor to retain the bio-carrier elements in the bioreactor.

Example 14: Ammonia Removal in 1-Stage MBBR Utilizing Bio-Carrier Elements Based on Municipal Digested Sludge With MBBR bioreactor operational procedure according to Example 8, FIG. 19 shows the results of influent and effluent ammonia nitrogen ($NH_4$—N) and effluent nitrite ($NO_2^-$—N) and nitrate ($NO_3^-$—N) concentrations during 70 days of operation of a bioreactor utilizing bio-carrier elements produced from dehydrated municipal digested sludge. $NO_2^-$—N concentration started to increase after around 55 days of operation with the corresponding decrease in $NH_4$—N concentration in the effluent. The soluble COD removal remained high (FIG. 15) simultaneously with the increasing $NH_4^+$—N removal.

Example 15: Operation of MBBR Bioreactors with Continuous and Sequential Phase Separation Utilizing Bio-Carrier Elements To assure the performance of the bio-carrier elements as active biofilm carriers in a MBBR process for treating wastewater by removing COD and ammonia utilizing both continuous and sequential phase separation mode to retain the bio-carrier elements in the bioreactor, a bench scale test was carried out. Bio-carrier elements produced from municipal activated sludge was utilized in a MBBR process. The bio-carrier elements utilized were selected to have a settling velocity characteristic above 0.05 m/s and below 0.2 m/s when measured as according to Example 3. A one-liter bioreactor was set up and 150 mL bulk volume of virgin bio-carrier elements were added. The bioreactors were continuously fed with an industrial wastewater containing around 500 mg/L soluble COD, 80 mg/L $NH_4^+$—N, 5 mg/L $PO_4^+$—P, buffer solution ($NaHCO_3$) and trace metals utilizing a hydraulic retention time of 2 hours and a temperature of 20° C. During the first 45 days the bioreactor was run with continuous aeration and the bio-carrier elements were thereby retained in the bioreactor by continuous phase separation utilizing a sieve (9) as shown in FIG. 7. During the days after day 45 and until end of trial (80 days) the bioreactor was run with sequential aeration and mechanical mixing and the bio-carrier elements were thereby retained in the bioreactor by sequential phase separation 8 as shown in FIG. 6. The sequence of the aeration cycle was; aeration for 15 min, no aeration for 1 min (settling of the bio-carrier elements) and discharge of effluent for 4 min at level above the settled carriers. This cycle was then repeated three times per hour.

Figure 20:
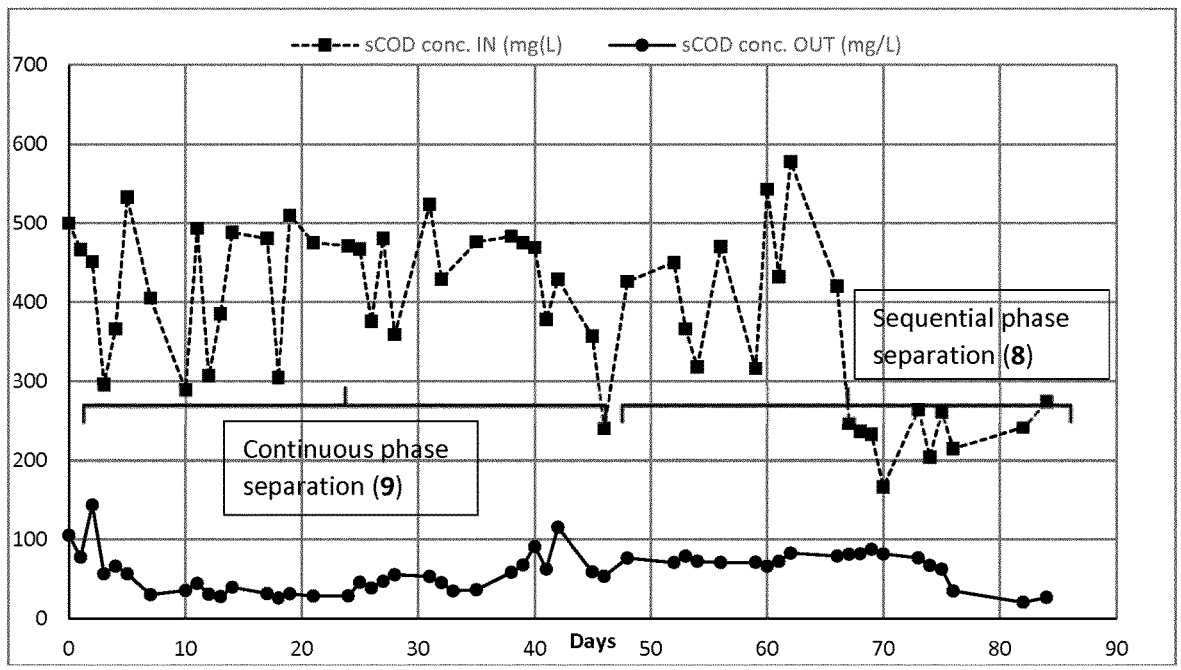
FIG. 20 is a diagram showing the soluble COD concentration in an industrial wastewater and the final soluble COD concentration of purified liquid as a function of days in a MBBR process utilizing bio-carrier elements produced using an industrial activated sludge as a base raw material where the bioreactor during the first 47 days was operated in continuous mode with continuous feed and aeration utilizing a sieve at the effluent outlet to retain the bio-carrier elements in the bioreactor. In the days following day 47 the operation mode was shifted from continuous phase separation mode to sequential phase separation mode, still using continuous feed but with intermittent aeration allowing the bio-carrier elements to settle and emptying the purified liquid from the top of the reactor above the bio-carrier element particle level to retain them in the bioreactor.

FIG. 20 shows the results of influent and effluent soluble COD concentrations during 150 days of operation with the change in phase operation after 45 days marked. The soluble COD removal was around 90% after 5 days. The removal was then stabilized between 90-95% until day around day 40 when soluble COD removal decreased to 80% because of an accidental operational issue thereby losing some bio-carrier elements out of the process.

The sequential phase separation mode with intermittent aeration was started at day 47 and the soluble COD removal was lower compared to the continuous phase separation mode with constant aeration being around 85% because of the loss of some bio-carrier elements. Therefore the soluble COD concentration in the incoming industrial wastewater was decreased to half the concentration to 250 mg/L adjust for the loss of bio-carrier elements. After 15 days of operation with the lower soluble COD concentration in the wastewater feed the removal was again above 90%.

The $NH_4^+$—N concentration in the incoming industrial wastewater and the outgoing effluent was measured together with the $NO_3^-$—N and $NO_2^-$—N concentration in the effluent with results shown in FIG. 21. Nitrification in the biofilm was initiated after 24 days of operation (continuous phase separation utilizing a sieve, 9, for retaining the bio-carrier elements) when $NH_4^+$—N concentration started to decrease and $NO_2^-$—N concentration started to increase in the effluent. On day 32 the $NO_2^-$—N concentration in the effluent started to decrease and was again low at day 40. During this time the sieve located at the effluent to retain the bio-carrier elements was overgrown because the sieve cleaning mechanism put in place did not function. This caused the bioreactor to overgrow with sludge in suspension and bio-carrier elements were lost due to overflow of the bioreactor. This reduced the nitrification rate.

The sieve cleaning mechanism was restored and the reactor was cleaned from biomass in suspension and the nitrification was recovered from day 40 to day 47 with again increasing $NO_2^-$—N concentration and decreasing $NH_4^+$—N concentration in the effluent. After day 47 the bioreactor was, as said before, operated in sequential phase separation mode with intermittent aeration to retain the bio-carrier elements in the bioreactor. After this point the nitrification increased with nitritation setting in after 65 days.

It is seen in FIG. 21 that the operation of the bioreactor in sequential phase separation mode instead of utilizing constant aeration was a more stable process for nitrification when simultaneously removing COD in a 1-stage reactor. The sequential phase separation ensured removing biomass in suspension while retaining the bio-carrier elements. Continuous phase separation utilizing a sieve to retain the bio-carrier elements in the bioreactor tend to retain significantly more of the suspended biomass hampering the nitrification capacity of the biofilm on the bio-carrier elements and also lower the dissolved oxygen concentration. In the sequential phase separation mode soluble COD was removed by more than 90% while simultaneously removing $NH^+_4$—N effectively.

Example 16: Operation of 1-Stage MBBR Utilizing K5 Carrier Media as Reference

In addition a MBBR utilizing standard plastic K5 carrier media having a specific protected surface area (PICTURE of K5) was set up to compare the initial COD removal rate during start-up with the bio-carrier elements. A 50% fill grade of K5 carrier media was added to 1 L reactor and an industrial wastewater containing 500 mg/L soluble COD, 80 mg/L NH4+—N, 5 mg/L PO4+—P, buffer solution ($NaHCO_3$) and trace metals was continuously fed to the reactor using a hydraulic retention time of 2 hours at a temperature of 20° C. The K5 carrier media had a large enough volume not to pass the outlet and were thereby retained in the bioreactor.

The soluble COD removal rate utilizing bio-carrier elements could also be compared to the soluble COD removal rate when utilizing commercial plastic K5 carrier media with protected surface. In FIG. 22 the soluble COD concentration in the effluent utilizing K5 carrier media with a fill grade of 50% and compared to the soluble COD concentration in the effluent when utilizing bio-carrier elements. It is seen in FIG. 11b that the main soluble COD concentration is removed in a significantly shorter time when utilizing bio-carrier elements compared to when using K5 carrier media. The initial biofilm build-up of heterogeneous bacteria on the K5 media is initially slow and it took 6 days for the removal rate of the biofilm on the K5 media to catch up with the biofilm on the bio-carrier elements.

The invention claimed is:

1. A bio-carrier for carrying a biofilm in a moving bed biofilm reactor (MBBR) comprising:
   the bio-carrier comprising a dehydrated sludge particle;
   wherein the bio-carrier is a virgin carrier and a mobile structure configured to support and carry a biofilm in a MBBR;
   wherein the dehydrated sludge particle has a nominal diameter of 0.7 to 7 mm, the dehydrated sludge particle has a volumetric mass density of 1.02 to 1.8 g/cm³, as determined by weighing the dehydrated sludge particle in air and then in ethanol (99.9 vol-%) at 20 0C and 1 atm, and the dehydrated sludge particle has a water content between 0 and 50 weight-%, as measured as water content fraction of the dehydrated sludge particle on total mass basis;
   wherein the particle has a settling velocity in the range of 0.02 m/s to 0.4 m/s in denatured ethanol (99.9 vol.- % ethanol) at 20 0C and 1 atm.

2. A bio-carrier according to claim 1, wherein the dehydrated sludge particle is comprised of sludge from a water purification process and/or or an organic solids treatment process.

3. A bio-carrier according to claim 2, wherein the sludge is primary, secondary or tertiary sludge from a municipal or industrial wastewater treatment process or any combination thereof or digested sludge from an organic solids treatment process.

4. A bio-carrier according to claim 3, wherein the sludge have been digested in an anaerobic digester.

5. The bio-carrier according to claim 1, wherein the particle has a weight of 0.1 to 100 mg.

6. The bio-carrier according to claim 1, wherein the particle has a nominal diameter of 0.9 to 4 mm.

7. The bio-carrier according to claim 1, wherein the particle has an inorganic content between 0 and 90 weight-%, as measured as ash content fraction of the particle on dry mass basis.

8. A method of biologically treating water or wastewater containing contaminants:
   directing the water or wastewater into a MBBR;
   placing a plurality of the bio-carriers of claim 1 into the MBBR;
   continuously or intermittently aerating or mixing the water or wastewater in the MBBR so as to maintain dehydrated sludge particles of the bio-carriers in suspension;
   wherein the dehydrated sludge particles of the bio-carriers provide surfaces for biofilm growth; growing biofilms on the dehydrated sludge particles of the bio-carriers in the MBBR; and
   biologically treating the water or wastewater in the MBBR as the biofilms on the dehydrated sludge particles biodegrade the contaminants in the water or wastewater.

9. The method according to claim 8 wherein the MBBR comprises one or more connected volumes or zones in which biological activity is promoted, one or several inlets for providing water or wastewater to be treated, one or several outlets for withdrawing treated water or wastewater, and one or more aerators or mixers.

10. The method according to claim 8, wherein the aerating is intermittent aeration; or the mixing is intermittent mixing.

11. The method according to claim 8 further including: intermittently withdrawing treated water or wastewater from the MBBR; and retaining the dehydrated sludge particles of the bio-carriers and the biofilm thereon in the MBBR as the treated water or wastewater is withdrawn by deactivating the aerating or mixing in the MBBR, thereby allowing the dehydrated sludge particles of the bio-carriers and the biofilm thereon to settle in the MBBR.

12. The method according to claim 8 wherein the treated water or wastewater is continuously withdrawn from the MBBR and the MBBR further comprises a screen, sieve, filter, membrane or phase separator to retain the dehydrated sludge particles and the biofilm thereon in the MBBR.

13. The method according to claim 8, wherein the MBBR system further comprises a screen, sieve, filter, membrane, or phase separator to retain the bio-carrier in the MBBR.

14. The method according to claim 8, wherein additional dehydrated sludge particles are placed in the MBBR periodically, daily, weekly, monthly, or annually, to replenish lost or spent the dehydrated sludge particles and the additional dehydrated sludge particles.

15. A method of manufacturing the bio-carrier of claim 1 comprising: (i) obtaining sludge from a sludge source; (ii)

dehydrating the sludge to a total dry solids content of more than 65 wt.-%; and (iii) forming the dehydrated sludge into dehydrated sludge particles.

16. The method according to claim 15, wherein dehydrating the sludge in step (ii) utilizes one or more sludge dehydration technologies selected from the group consisting of: thin layer drying, belt drying, rotary drum drying, disc drying, vertical drying, solar drying, vacuum drying, fluidized bed drier, and any combination thereof.

17. The method according to claim 15, wherein the dehydrated sludge particles are formed in step (iii) by milling, grinding, cutting, crushing, pelletization, granulation, extrusion or pressing.

18. The method according to claim 15, wherein steps (ii) and (iii) take place simultaneously, using a technique for both drying and mechanically forming the dehydrated sludge into the dehydrated sludge particles.

19. The method according to claim 15, further including characterizing the dehydrated sludge particles from step (iii) and, based on the characterization, selecting dehydrated sludge particles for use in carrying a biofilm in the MBBR.

20. The method according to claim 15, wherein the sludge is dewatered in a dewatering step (a), before the dehydration step (ii), to reach a total solids content between 5-50 wt.-%.

21. The method according to claim 15, The method according to wherein the dewatering in step (a) utilizes one or more different technologies selected from the group consisting of settling techniques, centrifugation techniques, hydrocyclone techniques, dissolved air flotation techniques, and filter pressing techniques.

22. The method according to claim 15, wherein one or more additives are added and mixed with the sludge before the dehydration step (ii), the one or more additives being an organic or inorganic components, affecting the volumetric mass density of the dehydrated sludge, a fibrous component increasing the mechanical strength of the dehydrated sludge particle, or a nutrient or mineral promoting biomass growth.

23. The bio-carrier according to claim 3, wherein the sludge has been digested in an aerobic digester.

24. The method according to claim 19 wherein the dehydrated sludge particles are sorted by a technology selected from the group consisting of sieving, screening, air classification, and specific gravity separation, or any combination thereof.

25. The bio-carrier according to claim 1 wherein the dehydrated sludge particle includes an outer surface that includes compartments formed in the outer surface and configured to facilitate biofilm attachment to the dehydrated sludge particle.

26. A bio-carrier for receiving and supporting a biofilm in a moving bed bioreactor (MBBR), comprising:
the bio-carrier comprising a dehydrated sludge particle;
wherein the bio-carrier is a virgin carrier and a mobile structure;
the dehydrated sludge particle having an outer surface configured to attach to and grow a biofilm in a MBBR;
the dehydrated sludge particle having a nominal diameter of 0.7 to 7 mm;
the dehydrated sludge particle having a volumetric mass density of 1.02 to 1.8 g/cm$^3$, as determined by weighing the particle in air and then in ethanol (99.9 vol-%) at 200C and 1 atm;
the dehydrated sludge particle having a dry solids content greater than 64 wt.-%; and the dehydrated sludge particle having a settling velocity in the range of 0.02 m/s to 0.4 m/s in denatured ethanol (99.9 vol.-% ethanol) at 200C and 1 atm.

27. A method of biologically treating water or wastewater containing contaminants: directing the water or wastewater into a MBBR; placing a plurality of the bio-carriers of claim 26 into the MBBR; continuously or intermittently aerating or mixing the water or wastewater in the MBBR so as to maintain the dehydrated sludge particles of the bio-carriers in suspension; wherein the dehydrated sludge particles of the bio-carriers provide surfaces for biofilm growth; growing biofilms on the dehydrated sludge particles of the bio-carriers in the MBBR; and biologically treating the water or wastewater in the MBBR as the biofilms on the dehydrated sludge particles of the bio-carriers biodegrade the contaminants in the water or wastewater.

28. The method according to claim 27 further including: intermittently withdrawing treated water or wastewater from the MBBR; and retaining the dehydrated sludge particles of the bio-carriers and the biofilm thereon in the MBBR as the treated water or wastewater is withdrawn by deactivating the aerating or mixing in the MBBR, thereby allowing the dehydrated sludge particles of the bio-carriers and the biofilm thereon to settle in the MBBR.

29. A method of manufacturing the bio-carrier of claim 26 comprising: (i) obtaining sludge from a sludge source; (ii) dehydrating the sludge to a total dry solids content of more than 65 wt.-%; and (iii) forming the dehydrated sludge into dehydrated sludge particles.

30. The method according to claim 29, wherein dehydrating the sludge in step (ii) utilizes one or more sludge dehydration technologies selected from the group consisting of: thin layer drying, belt drying, rotary drum drying, disc drying, vertical drying, solar drying, vacuum drying, fluidized bed drier, and any combination thereof.

31. The method according to claim 29, wherein steps (ii) and (iii) take place simultaneously, using a technique for both drying and mechanically forming the dehydrated sludge into the dehydrated sludge particles.

32. The method according to claim 29, wherein one or more are added and mixed with the sludge before the dehydration step (ii), the one or more additives being an organic or inorganic components, affecting the volumetric mass density of the dehydrated sludge, a fibrous component increasing the mechanical strength of the dehydrated sludge particle, or a nutrient or mineral promoting biomass growth.

* * * * *